United States Patent
Ueda et al.

(10) Patent No.: US 8,496,085 B2
(45) Date of Patent: Jul. 30, 2013

(54) MOTOR CONTROL DEVICE AND ELECTRIC POWER STEERING APPARATUS

(75) Inventors: Takeshi Ueda, Kashiba (JP); Shingo Maeda, Kashiwara (JP); Yoshinobu Shimizu, Sakai (JP); Hayato Komatsu, Ama-gun (JP)

(73) Assignee: JTEKT Corporation, Osaka (JP)

( * ) Notice: Subject to any disclaimer, the term of this patent is extended or adjusted under 35 U.S.C. 154(b) by 65 days.

(21) Appl. No.: 13/320,839

(22) PCT Filed: Jun. 21, 2010

(86) PCT No.: PCT/JP2010/060473
§ 371 (c)(1),
(2), (4) Date: Nov. 16, 2011

(87) PCT Pub. No.: WO2010/150745
PCT Pub. Date: Dec. 29, 2010

(65) Prior Publication Data
US 2012/0080259 A1 Apr. 5, 2012

(30) Foreign Application Priority Data
Jun. 23, 2009 (JP) ................................ 2009-148482

(51) Int. Cl.
*B62D 5/04* (2006.01)
*H02P 23/00* (2006.01)
(52) U.S. Cl.
USPC ............................. 180/446; 318/812; 701/41
(58) Field of Classification Search
USPC .. 180/443, 446, 404; 701/41, 42, 43; 318/599, 318/811, 727, 798, 801, 812
See application file for complete search history.

(56) References Cited

U.S. PATENT DOCUMENTS

| | | | | |
|---|---|---|---|---|
| 6,260,655 | B1 * | 7/2001 | Mukai et al. | 180/446 |
| 7,898,203 | B2 * | 3/2011 | Davis et al. | 318/490 |
| 2003/0121716 | A1 * | 7/2003 | Yamada et al. | 180/446 |

FOREIGN PATENT DOCUMENTS

| | | |
|---|---|---|
| JP | A-08-067262 | 3/1996 |
| JP | A-10-109655 | 4/1998 |
| JP | A-11-027976 | 1/1999 |
| JP | A-2002-127922 | 5/2002 |
| JP | A-2006-288029 | 10/2006 |

OTHER PUBLICATIONS

International Search Report issued in Application No. PCT/JP2010/060473; Dated Sep. 14, 2010 (With Translation).

* cited by examiner

*Primary Examiner* — Tony Winner
*Assistant Examiner* — Jacob Knutson
(74) *Attorney, Agent, or Firm* — Oliff & Berridge, PLC

(57) ABSTRACT

An angular velocity estimate ($\omega e$) used in motor control of an electric power steering is obtained as follows. In a first state period during which the motor substantially stops its rotation, a resistance calculation unit calculates a motor resistance value (Rc) on the basis of a detected value (Vm) of motor voltage and a detected value (Im) of motor current. An average calculation unit obtains an average value (Rav) of the calculated resistance values (Rc) in a retained period. A current-resistance characteristic that associates motor current with motor resistance is held in a characteristic holding unit, and a characteristic updating unit updates the current-resistance characteristic on the basis of the average value (Rav). An estimate calculation unit calculates the angular velocity estimate ($\omega e$) on the basis of the detected value (Vm) of motor voltage, the detected value (Im) of motor current and a motor resistance value (Rm) obtained from the current-resistance characteristic.

10 Claims, 14 Drawing Sheets

MOTOR CONTROL DEVICE AND ELECTRIC POWER STEERING APPARATUS

TECHNICAL FIELD

The invention relates to a motor control device that drives an electric motor and an electric power steering that uses the motor control device.

BACKGROUND ART

A motor control device in an electric power steering determines a target value of current that should be passed through a motor on the basis of a steering torque and a vehicle speed. In determining the target value, for example, Japanese Patent Application Publication No. 8-67262 and Japanese Patent Application Publication No. 10-109655 describe that a steering speed or its corresponding motor angular velocity is considered in addition to a steering torque and a vehicle speed. When a brushless motor is controlled, an angle detection sensor, such as a resolver, for detecting a motor rotation position is usually used, so an output signal of the angle detection sensor is subjected to temporal differentiation to make it possible to obtain a motor angular velocity. However, in motor control in which no angle sensor is used, like control over a brushed motor, a motor current and a voltage between motor terminals are detected, and a motor angular velocity ω is calculated on the basis of the following mathematical expression.

$$\omega = (V - I \times R)/k \quad (1)$$

Here, V is a voltage between the motor terminals, I is a motor current, R is a motor resistance (resistance between the motor terminals), and k is a counter electromotive force constant.

Incidentally, in a brushed motor, the contact resistance of a brush varies depending on the motor current, so the motor resistance depends on the motor current. Therefore, in a motor control device that drives a brushed motor, the motor resistance R is obtained on the basis of the characteristic that expresses the correlation between a motor current and a motor resistance (hereinafter, referred to as "current-resistance characteristic of the motor"), and the obtained motor resistance R is used when a motor angular velocity is calculated using the above mathematical expression (1). By so doing, the motor angular velocity ω may be further accurately obtained.

However, the motor resistance R varies depending on a variation in temperature and unevenness in manufacturing. Therefore, there may be a difference between the value of motor resistance R that is used to calculate the motor angular velocity ω using the above mathematical expression (1) and the value of actual motor resistance. Thus, even when the motor resistance R that is obtained on the basis of the current-resistance characteristic of the motor is used to calculate the motor angular velocity ω, the motor angular velocity cannot always be calculated accurately because of the above variation in temperature and unevenness in manufacturing. As a result, for example, in an electric power steering that uses the above described motor control device, the accuracy of control that uses a motor angular velocity decreases, and there is a concern that steering assist cannot be performed appropriately.

RELATED ART DOCUMENT

Patent Document

Patent Document 1: Japanese Patent Application Publication No. 8-67262

Patent Document 2: Japanese Patent Application Publication No. 10-109655

DISCLOSURE OF THE INVENTION

One object of the invention is to provide a motor control device that is able to accurately control driving of a motor even when a motor resistance varies because of a variation in temperature, unevenness in manufacturing, or the like. In addition, another object of the invention is to provide an electric power steering that includes such a motor control device.

Means for Solving the Problems

The invention relates to a motor control device that calculates an estimate of a rotation speed of an electric motor on the basis of a counter electromotive force generated in an armature winding of the electric motor, and that drives the electric motor using the estimate. A current detection unit detects a current flowing through the electric motor. A voltage detection unit detects a voltage applied to the electric motor. A determining unit determines whether the rotation speed of the electric motor is lower than or equal to a predetermined value that is substantially 0. A characteristic holding unit holds a correlation between a current flowing through the electric motor and a resistance of the electric motor as a current-resistance characteristic. A resistance calculation unit, when it is determined by the determining unit that the rotation speed of the electric motor is lower than or equal to the predetermined value, calculates a resistance value of the electric motor on the basis of a detected current value obtained by the current detection means and a detected voltage value detected by the voltage detection means. An estimate calculation unit calculates a velocity estimate indicating the rotation speed of the electric motor on the basis of the detected current value obtained by the current detection unit, the detected voltage value obtained by the voltage detection unit and a resistance value that is associated with the detected current value by the current-resistance characteristic or the resistance value calculated by the resistance calculation unit. A characteristic updating unit updates the current-resistance characteristic on the basis of the resistance value calculated by the resistance calculation unit and the detected current value used to calculate the resistance value.

BEST MODES FOR CARRYING OUT THE INVENTION

First Embodiment

Figure 1:
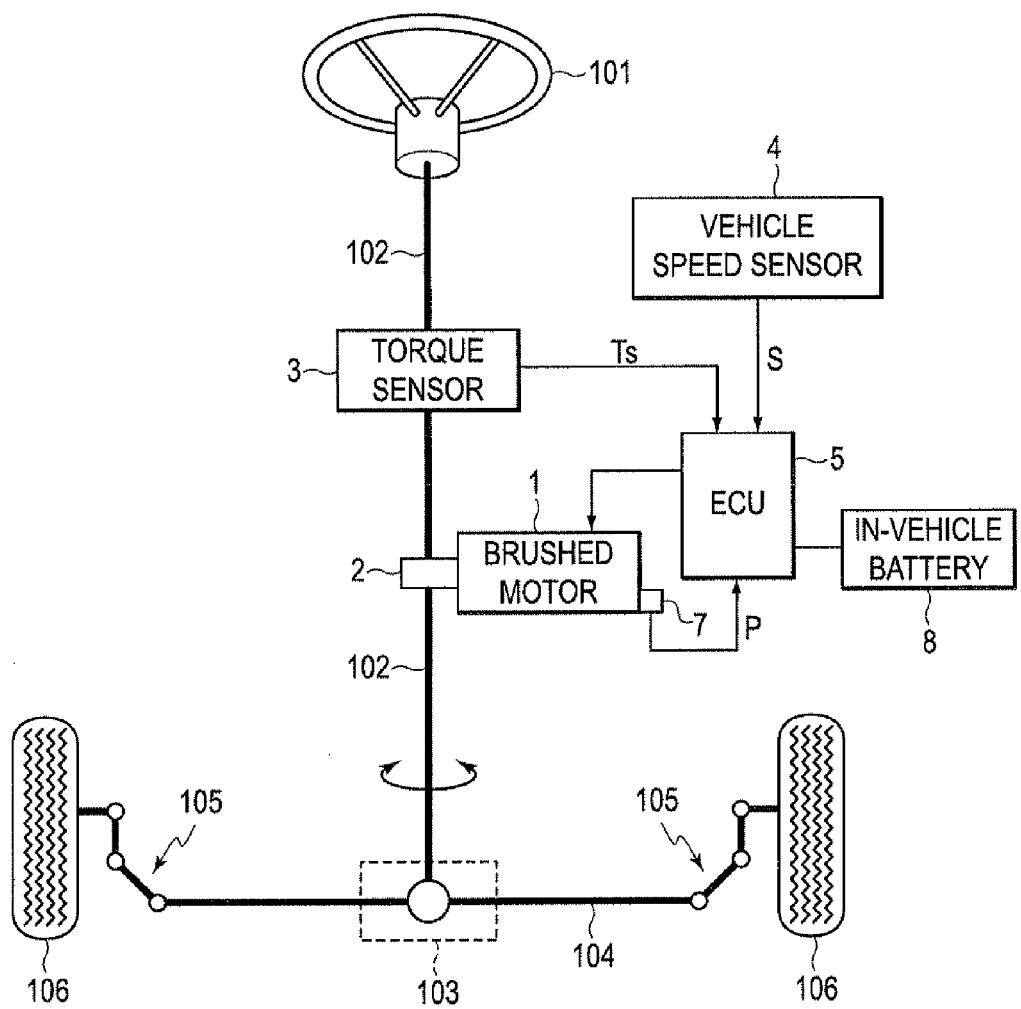
FIG. 1 is a schematic view that shows the configuration of an electric power steering that uses a motor control device according to a first embodiment together with the configuration of a vehicle associated therewith.

FIG. 1 is a schematic view that shows the configuration of an electric power steering that uses a motor control device according to a first embodiment of the invention together with the configuration of a vehicle associated therewith. The electric power steering is a column assist-type electric power steering that includes a brushed motor 1, a reduction gear 2, a torque sensor 3, a vehicle speed sensor 4 and an electronic control unit (ECU) 5 that serves as a motor control device. Note that the motor control device according to the invention desirably includes a sensor (hereinafter, referred to as "rotation sensor") 7 for detecting whether the motor 1 is rotating. The electric power steering shown in FIG. 1 has a Hall sensor as the rotation sensor 7. Note that the rotation sensor 7 is not limited to a Hall sensor; it may be the one that generates a pulse signal in response to rotation of the motor 1. In addition, it is not necessary to detect the rotation direction of the motor 1, so a low-cost sensor may be used as the rotation sensor 7.

As shown in FIG. 1, a steering wheel (steering wheel) 101 is fixed to one end of a steering shaft 102, and the other end of the steering shaft 102 is coupled to a rack shaft 104 via a rack and pinion mechanism 103. Both ends of the rack shaft 104 are coupled to wheels 106 via coupling members 105, each of which is formed of a tie rod and a knuckle arm. As a driver rotates the steering wheel 101, the steering shaft 102 rotates, and the rack shaft 104 reciprocates accordingly. As the rack shaft 104 reciprocates, the direction of the wheels 106 changes.

The electric power steering performs the following steering assist in order to reduce a load on the driver. The torque sensor 3 detects a steering torque Ts that is applied to the steering shaft 102 by operating the steering wheel 101. The vehicle speed sensor 4 detects a vehicle speed S. The rotation sensor 7 generates a pulse at a frequency corresponding to the rotation speed of the rotor of the motor 1, and outputs a pulse signal P that includes those pulses. When the rotor of the motor 1 is stopped, the rotation sensor 7 does not generate a pulse.

The ECU 5 receives electric power supplied from an in-vehicle battery 8, and drives the brushed motor 1 on the basis of the steering torque Ts, the vehicle speed S and the pulse signal P. As the brushed motor 1 is driven by the ECU 5, the brushed motor 1 generates steering assist force. The reduction gear 2 is provided between the brushed motor 1 and the steering shaft 102. The steering assist force generated by the brushed motor 1 is applied to rotate the steering shaft 102 via the reduction gear 2. As a result, the steering shaft 102 rotates on both the steering torque applied to the steering wheel 101 and the steering assist force generated by the brushed motor 1. In this way, the electric power steering performs steering assist in such a manner that the steering assist force generated by the brushed motor 1 is given to a steering mechanism of the vehicle.

<Configuration of Motor Control Device>

Figure 2:
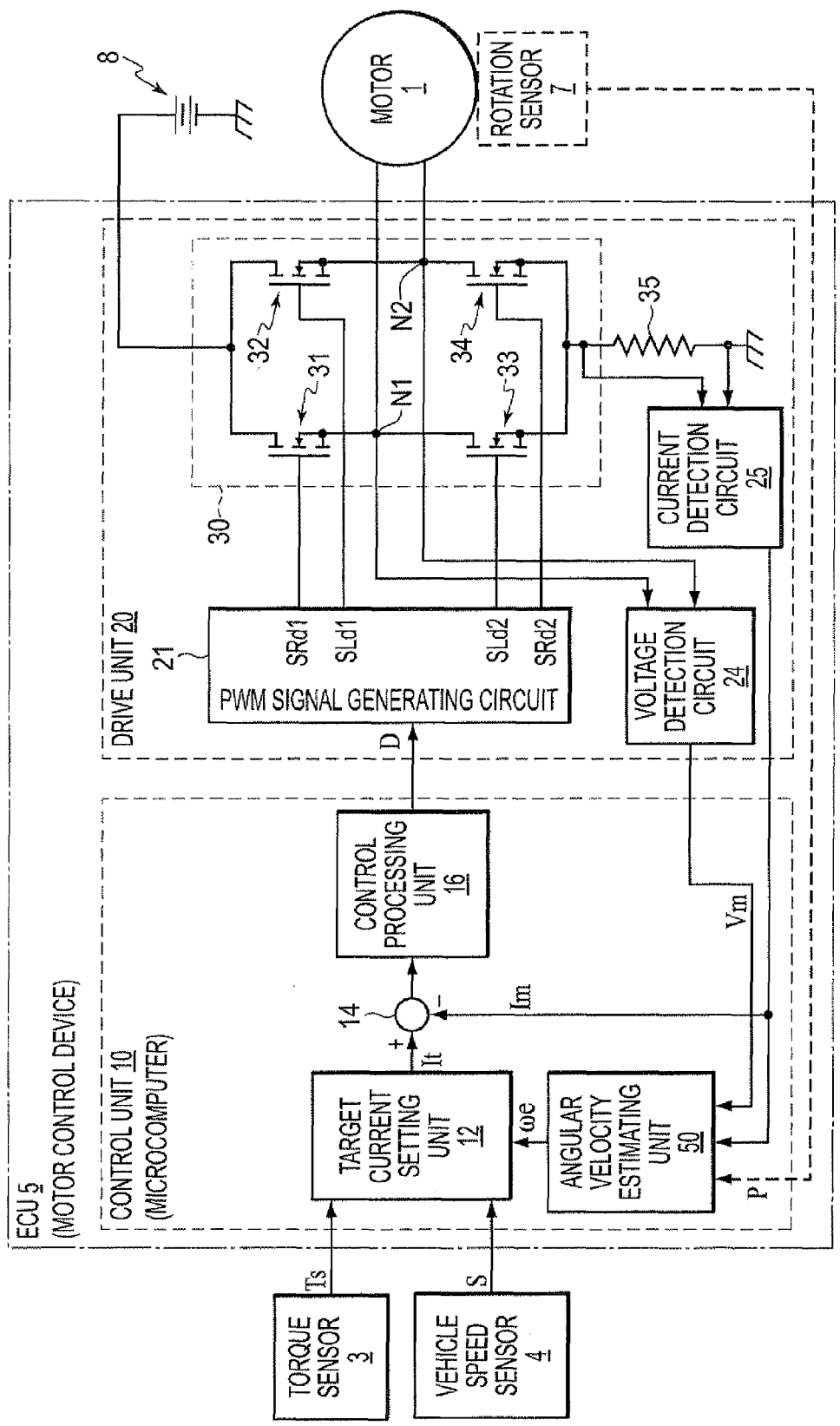
FIG. 2 is a block diagram that shows the configuration of the motor control device according to the first embodiment.

FIG. 2 is a block diagram that shows the configuration of the motor control device according to the first embodiment. The motor control device is used in the electric power steering. The motor control device is formed using the ECU 5, and drives the brushed motor 1. The ECU 5 is formed of a control unit 10 and a drive unit 20. The control unit 10 is implemented using a microcomputer (hereinafter, abbreviated as "microcomputer"). The drive unit 20 includes a motor drive circuit 30, a current detection resistance 35, a PWM signal generating circuit 21, a voltage detection circuit 24 and a current detection circuit 25. Note that the rotation sensor 7 is not used in the present embodiment, and the configuration that uses the rotation sensor 7 will be described as a second embodiment and an alternative embodiment.

The steering torque Ts output from the torque sensor 3 and the vehicle speed S output from the vehicle speed sensor 4 are input to the ECU 5, and these are given to the microcomputer 10 as input data. In addition, in the drive unit 20, as will be described later, a voltage applied to the motor 1, that is, a voltage between the terminals of the motor 1 (hereinafter, referred to as "motor voltage"), is detected by the voltage detection circuit 24, a current that flows through the armature winding in the motor 1 (hereinafter, referred to as "motor current") is detected by the current detection circuit 25, and a detected voltage value Vm and a detected current value Im as these detection results are also given to the microcomputer 10.

The microcomputer 10 executes programs stored in a memory (not shown) embedded in the ECU 5 to implement a target current setting unit 12, a subtracter 14, a control processing unit 16 and an angular velocity estimating unit 50 by software as functional units for controlling the motor 1. The angular velocity estimating unit 50 calculates an angular velocity estimate $\omega e$ that indicates the rotation speed of the rotor of the motor 1 on the basis of the above detected voltage value Vm and detected current value Im. In the second embodiment and alternative embodiment described later, the pulse signal P output from the rotation sensor 7 is also used to calculate the angular velocity estimate $\omega e$. The target current setting unit 12 determines a target value It of current that should be passed through the motor 1 on the basis of the above steering torque Ts and vehicle speed S and the angular velocity estimate $\omega e$. The subtracter 14 calculates a difference (It−Im) between the current target value It and the above detected current value Im. The control processing unit 16 executes proportional integral control processing based on the difference (It−Im) to calculate a command value D that indicates a voltage that should be applied to the motor 1 in order to cancel the difference (It−Im). The command value D is output from the microcomputer 10 and is given to the PWM signal generating circuit 21 of the drive unit 20.

The PWM signal generating circuit 21 generates first and second rightward PWM signals SRd1 and SRd2 and first and second leftward PWM signals SLd1 and SLd2 in response to the command value D given from the microcomputer 10. Here, the sign of the command value D indicates whether the torque that should be generated by the motor 1 is a torque in a direction to assist in steering rightward (hereinafter, referred to as "rightward torque") or a torque in a direction to assist in steering leftward (hereinafter, referred to as "leftward torque"). When the rightward torque is generated, the rightward PWM signals SRd1 and SRd2 are generated as PWM signals having duty ratios corresponding to the command value D, and the leftward PWM signals SLd1 and SLd2 are generated as non-active signals. When the leftward torque is generated, the leftward PWM signals SLd1 and SLd2 are generated as PWM signals having duty ratios corresponding to the command value D, and the rightward PWM signals SRd1 and SRd2 are generated as non-active signals.

The motor drive circuit 30 is a bridge circuit that is formed of four power field-effect transistors (hereinafter, referred to as "FETs") 31 to 34 that are switching elements. The bridge circuit is connected between the power supply line of the battery 8 and a ground line, and the motor 1 is connected to the bridge circuit as a load. That is, the bridge circuit is formed of the power supply line-side FETs 31 and 32 connected to the power supply line and the ground line-side FETs 33 and 34 connected to the ground line via the current detection resistance 35. The positive terminal of the motor 1 is connected to a node N1 between the power supply line-side FET 31 and the ground line-side FET 33. The negative terminal of the motor 1 is connected to a node N2 between the power supply line-side FET 32 and the ground line-side FET 34. The above rightward PWM signals SRd1 and SRd2 are respectively applied to the gate terminal of the power supply line-side FET 31 and the gate terminal of the ground line-side FET 34. The above leftward PWM signals SLd1 and SLd2 are respectively applied to the gate terminal of the power supply line-side FET 32 and the gate terminal of the ground line-side FET 33. By so doing, the FETs 31 and 34 or the FETs 32 and 33 are turned on or off at the duty ratios corresponding to the command value D to apply a voltage having a level and a polarity corresponding to the sign of the command value D from the motor drive circuit 30 to the motor 1. As a result, current is supplied from the motor drive circuit 30 to the motor 1, and the motor 1 generates a steering assist force corresponding to the steering torque Ts, the vehicle speed S and the angular velocity estimate ωe.

While the motor 1 is driven as described above, the voltage applied to the motor 1, that is, the voltage between the terminals of the motor 1, is detected by the voltage detection circuit 24. At the same time, the current that flows through the motor 1 is detected by the current detection circuit 25 on the basis of the voltage between both terminals of the current detection resistance 35. The detected voltage value Vm and the detected current value Im are input to the microcomputer 10, and, as described above, are used to calculate the angular velocity estimate ωe and calculate the difference (It−Im) for feedback control of the motor 1.

<Configuration and Operation of Angular Velocity Estimating Unit>

Figure 3:
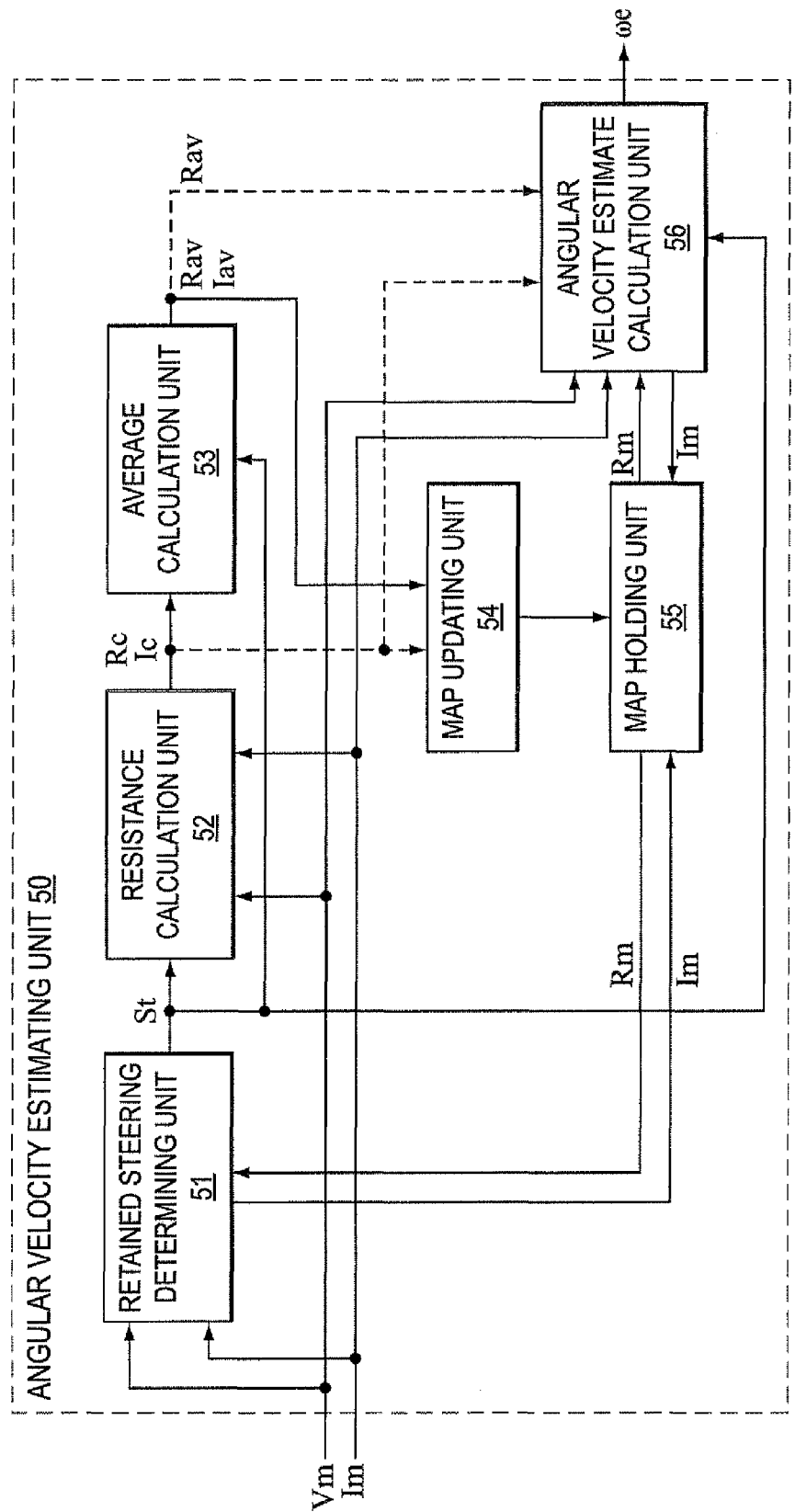
FIG. 3 is a block diagram that shows the configuration of an angular velocity estimating unit in the first embodiment.

FIG. 3 is a block diagram that shows the functional configuration of the angular velocity estimating unit 50 that calculates the angular velocity estimate ωe used to determine the current target value It in the first embodiment. As shown in FIG. 3, the angular velocity estimating unit 50 includes a retained steering determining unit 51, a resistance calculation unit 52, an average calculation unit 53, a map updating unit 54, a map holding unit 55 and an angular velocity estimate calculation unit (hereinafter, abbreviated as "estimate calculation unit") 56. The detected voltage value Vm obtained by the above voltage detection circuit 24 and the detected current value Im obtained by the current detection circuit 25 are input to the retained steering determining unit 51, the resistance calculation unit 52 and the estimate calculation unit 56.

Generally, the angular velocity ω of the rotor of the brushed motor 1 is given by the following mathematical expression as described above.

$$\omega = (V - I \times R)/k \qquad (2)$$

Here, V is a motor voltage (voltage between the terminals), I is a motor current, R is a motor resistance (resistance between the terminals), and k is a counter electromotive force constant. Thus, when the value of the motor resistance R is acquired in addition to the above detected voltage value Vm and detected current value Im, the angular velocity ω may be calculated.

Then, the map holding unit 55 in the angular velocity estimating unit 50 holds a table that associates a motor current with a motor resistance on the basis of the current-resistance characteristic of the motor 1 as a resistance map, and functions as characteristic holding means. The retained steering determining unit 51 consults the resistance map to obtain a motor resistance value Rm corresponding to the detected current value Im. Then, the retained steering determining unit 51 substitutes V=Vm, I=Im and R=Rm into the above mathematical expression (2) to calculate the angular velocity ω (hereinafter, the angular velocity ωd is referred to as "determination angular velocity"). When the determination angular velocity ωd is lower than or equal to a predetermined value ε near 0, the retained steering determining unit 51 assumes that the rotation of the rotor of the motor 1 is stopped, and determines that the electric power steering is in a retained state. On the other hand, when the determination angular velocity ωd is higher than the predetermined value ε, the retained steering determining unit 51 assumes that the rotor of the motor 1 is rotating, and determines that the electric power steering is in a steered state. The determination result is output from the retained steering determining unit 51 as a rotation state signal St, and is input to the resistance calculation unit 52, the average calculation unit 53 and the estimate calculation unit 56.

When the electric power steering is in the retained state and the rotor of the motor 1 is stopped, the angular velocity ω is 0, so the motor resistance R may be calculated by the following mathematical expression (3) on the basis of the above mathematical expression (2).

$$R = V/I \qquad (3)$$

Then, the resistance calculation unit 52 assumes that the angular velocity ω is 0 when the rotation state signal St indicates the retained state, and substitutes V=Vm and I=Im into the above mathematical expression (3) to calculate the value of the motor resistance R (hereinafter, the value is referred to as "calculated resistance value" and is denoted by the reference sign "Rc"). The thus obtained calculated resistance value Rc (=Vm/Im) is input to the average calculation unit 53. In addition, the detected current value Im used to calculate the calculated resistance value Rc is also input to the average calculation unit 53 as a calculation-time current value Ic. In this way, at each control interval that is an interval at which the target value It of current that should be passed through the motor 1 is calculated, the calculated resistance value Rc and the calculation-time current value Ic are input to the average calculation unit 53. The calculated resistance value Rc is desirably input also to the estimate calculation unit 56.

The average calculation unit 53 obtains the average value of the calculated resistance values Rc and average value of the calculation-time current values Ic input from the resistance calculation unit 52 at respective control intervals in a period during which the electric power steering is in the retained state (hereinafter, referred to as "retained period") on the basis of the above rotation state signal St, and outputs the average values as an average resistance value Rav and an average current value Iav. A specific method of calculating these average values Rav and Iav will be described later. The average resistance value Rav and average current value Iav output from the average calculation unit 53 are input to the map updating unit 54. Note that, instead of the average resistance value Rav and the average current value Iav, the calculated resistance value Rc and calculation-time current value Ic output from the resistance calculation unit 52 may be input to the map updating unit 54. In addition, the average resistance value Rav may be input also to the estimate calculation unit 56. The retained period is a first state period.

The estimate calculation unit 56 consults the resistance map held in the map holding unit 55 to obtain a motor resistance value Rm corresponding to the above detected current value Im, and uses the above detected voltage value Vm and detected current value Im to calculate an angular velocity estimate ωe by the above mathematical expression (2). That is, the estimate calculation unit 56 substitutes V=Vm, I=Im and R=Rm into the above mathematical expression (2) to calculate an angular velocity estimate ωe. In addition, instead of the motor resistance value Rm obtained from the resistance map, the above average resistance value Rav may be used to obtain an angular velocity estimate ωe by the above mathematical expression (2). Furthermore, the above calculated resistance Rc may be used to obtain an angular velocity estimate ωe by the above mathematical expression (2) in a retained period based on the rotation state signal St. Some specific examples of such a method of calculating an angular velocity estimate ωe will be described later.

The thus calculated angular velocity estimate ωe is output from the angular velocity estimating unit 50, and is input to the target current setting unit 12 as described above (FIG. 2). By so doing, in the target current setting unit 12, in the process for determining a target value It of current that should be passed through the motor 1, for example, damping control, detecting a state where the steering wheel is fully rotated, or the like, may be performed on the basis of the angular velocity estimate ωe.

In the angular velocity estimating unit 50, the resistance map used to obtain a motor resistance value Rm does not fixedly give the correlation between a motor current and a motor resistance, that is, the current-resistance characteristic, in the motor 1, but the resistance map is updated by the map updating unit 54. That is, the map updating unit 54 updates the resistance map in the map holding unit 55 on the basis of the calculated resistance value Rc and calculation-time current value Ic or the average resistance value Rav and average current value Iav, obtained in a retained period.

Figure 4:
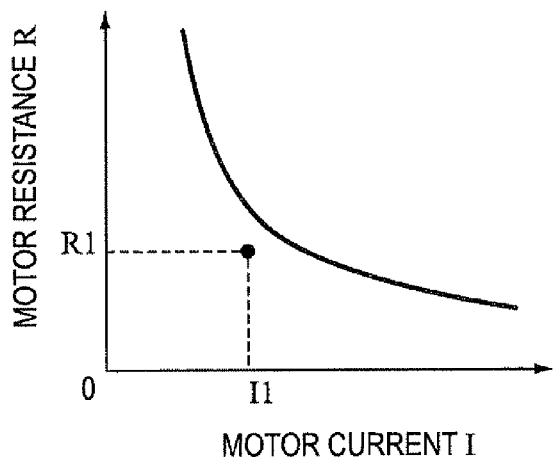
FIG. 4 is a graph for illustrating the current-resistance characteristic of a motor and a resistance value and a detected current value for updating a resistance map in the first embodiment.

FIG. 4 shows the current-resistance characteristic of the motor 1 in the orthogonal coordinate system formed of the horizontal axis that represents a motor current I and the vertical axis that represents a motor resistance R. That is, the curve indicated by the solid line in FIG. 4 shows the current-resistance characteristic, and data that associate various values of motor current I with values of motor resistance R in accordance with the curve (hereinafter, referred to as "characteristic curve") are held in the map holding unit 55 as the resistance map. Now, a current value I1 and a resistance value R1 are input to the map updating unit 54 as the calculated resistance value Rc and the calculation-time current value Ic or the average resistance value Rav and the average current value Iav, and these current value I1 and resistance value R1 correspond to point A shown in FIG. 4 in the orthogonal coordinate system. The point A deviates from the characteristic curve. In this case, the map updating unit 54 changes the data that constitute the characteristic curve, that is, the resistance map, (updates the resistance map) so that the characteristic curve passes through the point A.

Figure 5A:
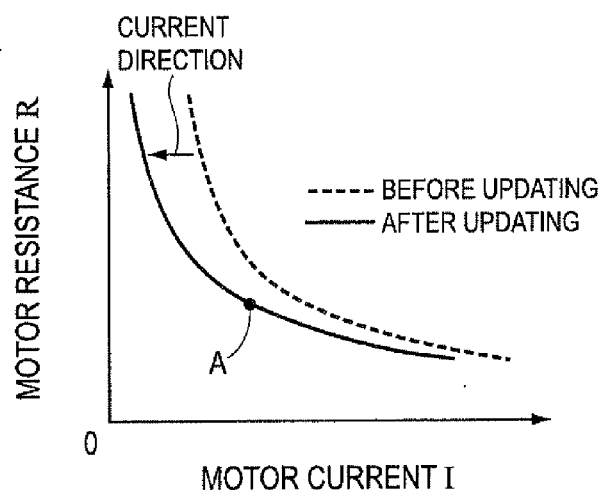
FIG. 5A is a graph for illustrating a method of updating the resistance map in the first embodiment.
Figure 5B:
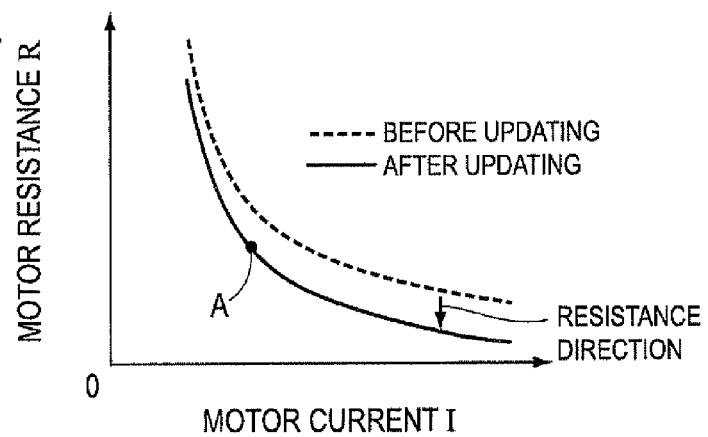
FIG. 5B is a graph for illustrating a method of updating the resistance map in the first embodiment.
Figure 5C:
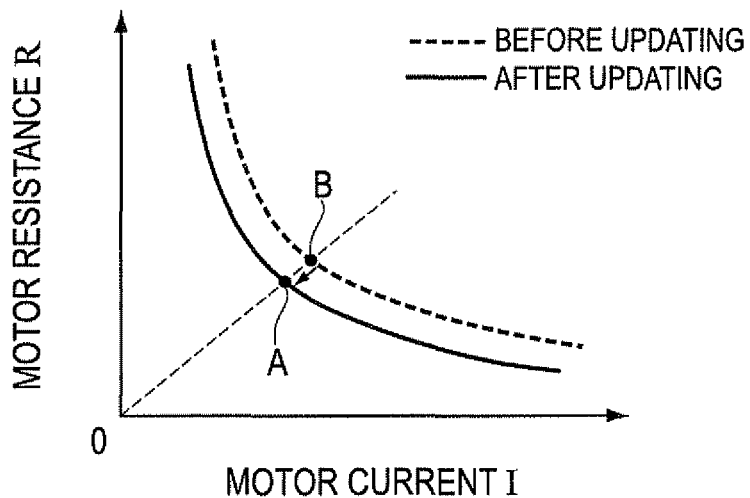
FIG. 5C is a graph for illustrating a method of updating the resistance map in the first embodiment.

FIG. 5A to FIG. 5C are graphs for illustrating specific examples of such a method of updating the resistance map. FIG. 5A shows a first updating method, the dotted curve indicates the characteristic curve before updating, and the solid curve indicates the characteristic curve after updating (the same applies to FIG. 5B, FIG. 5C and FIG. 6). When the first updating method is employed, the map updating unit 54 translates the characteristic curve in the horizontal axis, that is, the current direction, so that the characteristic curve passes through the point A, and, after updating, the resistance map corresponding to the translated characteristic curve (curve indicated by the solid line) is held in the map holding unit 55.

FIG. 5B shows a second updating method. When the second updating method is employed, the map updating unit 54 translates the characteristic curve in the vertical axis, that is, the resistance direction, so that the characteristic curve passes through the point A, and, after updating, the resistance map corresponding to the translated characteristic curve (curve indicated by the solid line) is held in the map holding unit 55.

FIG. 5C shows a third updating method. When the third updating method is employed, the map updating unit 54 translates the characteristic curve so that, when the intersection of the line that passes through the origin of the orthogonal coordinates and the point A and the characteristic curve before updating (curve indicated by the dotted line) is B, the intersection B coincides with the point A. After updating, the resistance map corresponding to the translated characteristic curve (curve indicated by the solid line) is held in the map holding unit 55.

Figure 6:
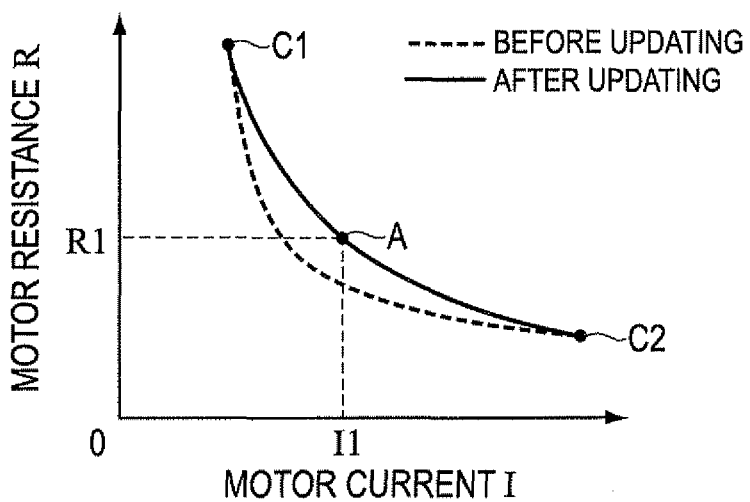
FIG. 6 is a graph for illustrating another method of updating the resistance map in the first embodiment.

The method of updating the resistance map is not limited to translating the characteristic curve as in the case of the first to third updating methods. For example, it is also applicable that, as shown in FIG. 6, both ends C1 and C2 of the characteristic curve are fixed and the curve is deformed so as to pass through the point A. In addition, it is also applicable that, when the resistance map is updated, not all the resistance map is changed but part of the resistance map is updated. Furthermore, in the angular velocity estimating unit 50 shown in FIG. 3, the current-resistance characteristic of the motor 1 is held as a map, that is, data that associate a motor current with a motor resistance; instead, the function or approximate expression that expresses the current-resistance characteristic of the motor 1 may be held (the same applies to the other embodiments described later). In this case, a characteristic updating unit that serves as a functional element corresponding to the map updating unit 54 changes a parameter for determining the function or approximate expression on the basis of the calculated resistance value Rc and the calculation-time current value Ic or the average resistance value Rav and the average current value Iav.

Second Embodiment

The second embodiment will be described with reference to FIG. 7 and FIG. 8. The second embodiment differs from the first embodiment only in the angular velocity estimating process for calculating an angular velocity estimate ωe in the angular velocity estimating unit 50, so only the difference will be described below.

Figure 7:
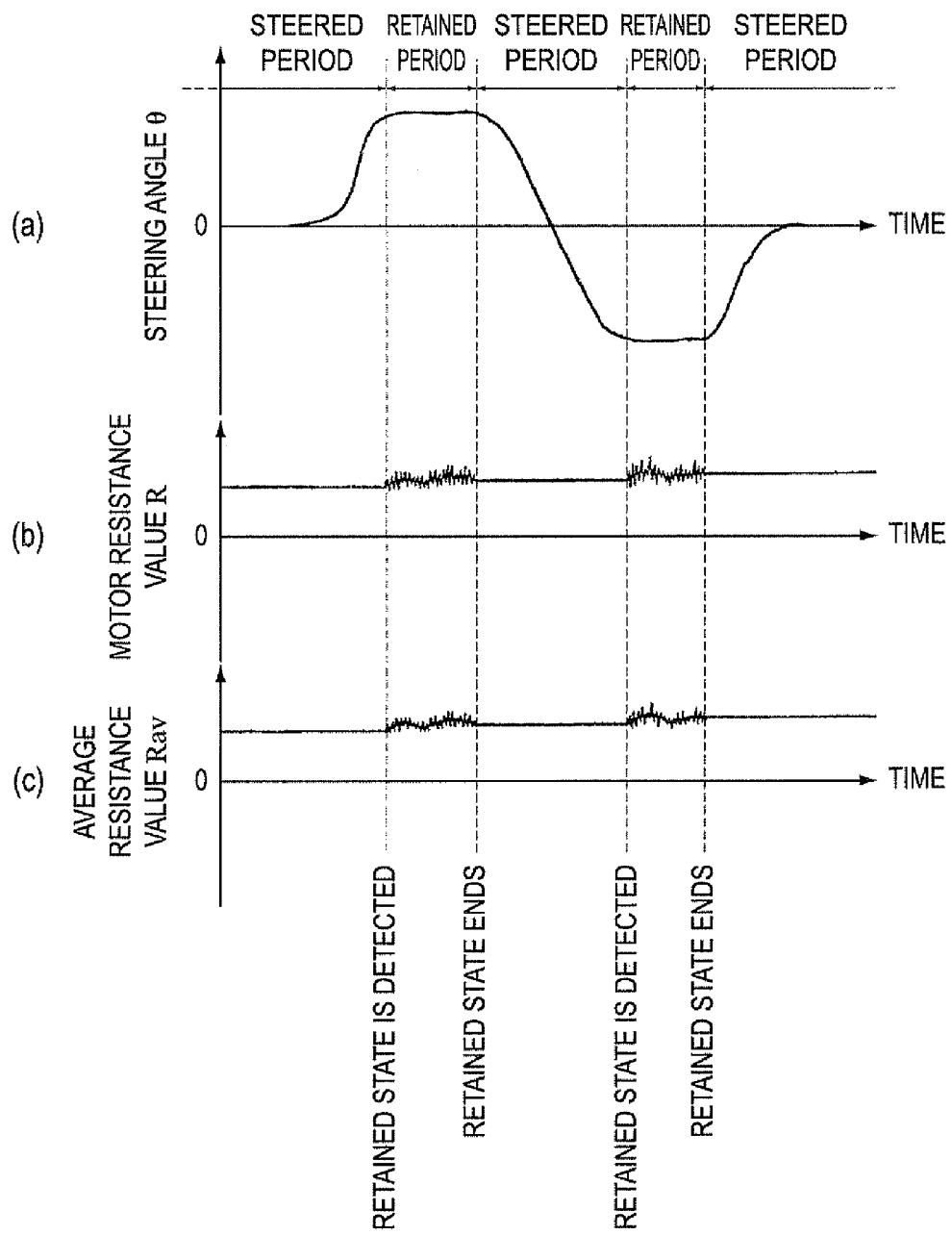
FIG. 7 is a waveform chart for illustrating a first angular velocity estimating process in second and third embodiments.

FIG. 7 is a waveform chart for illustrating the angular velocity estimating process in the embodiment. FIG. 7(a) shows a temporal variation in steering angle θ in the electric power steering that uses the motor control device as the ECU 5. FIG. 7(b) shows a variation in motor resistance value R used to calculate an angular velocity estimate ωe when the steering angle θ varies as shown in FIG. 7(a). FIG. 7(c) shows a variation in average resistance value Rav calculated when the steering angle θ varies as shown in FIG. 7(a). However, in FIG. 7(c), the average resistance value Rav in each retained period is indicated by the wide line, and the motor resistance value R is indicated by the narrow line. In addition, FIG. 8 is a block diagram that shows the functional configuration of the angular velocity estimating unit 50 corresponding to the angular velocity estimating process in the second embodiment. The configuration of FIG. 8 is limited from the configuration of the angular velocity estimating unit 50 shown in FIG. 3 so as to correspond to only the angular velocity estimating process. Hereinafter, the angular velocity estimating process in the second embodiment will be described with reference to FIG. 7 and FIG. 8. Note that the detailed description of portions similar to the angular velocity estimating process according to the configuration shown in FIG. 3 is omitted (the same applies to the other embodiments described later).

In the angular velocity estimating process of the second embodiment, the resistance map is not used, the retained steering determining unit 51 holds the average resistance value Rav in the last retained period, and determines whether it is in the retained state on the basis of the determination angular velocity ωd calculated using the average resistance value Rav by the mathematical expression (2). In a retained period that is a period during which it is determined by the retained steering determining unit 51 that it is in the retained state (period during which the rotation state signal St indicates the retained state), the resistance calculation unit 52 obtains a calculated resistance value Rc using the detected voltage value Vm and the detected current value Im by the mathematical expression (3) at each control interval. The estimate calculation unit 56 uses the calculated resistance value Rc, the detected voltage value Vm and the detected current value Im to calculate an angular velocity estimate ωe by the mathematical expression (2).

In this retained period, the average calculation unit 53 accumulates the calculated resistance value Rc obtained at each control internal by the resistance calculation unit 52, and calculates an average resistance value Rav from the accumulated value. The estimate calculation unit 56 holds the average resistance value Rav until a new average resistance value Rav is calculated in the next retained period. The estimate calculation unit 56 uses the held average resistance value Rav, the detected voltage value Vm and the detected current value Im to calculate an angular velocity estimate ωe by the mathematical expression (2) in a steered period that is a period during it is determined by the retained steering determining unit 51 that it is in the steered state (period during which the rotation state signal St indicates the steered state). As a new average resistance value Rav is calculated in the next retained period, the estimate calculation unit 56 updates the held average resistance value Rav with the new average resistance value Rav. Note that, when an average resistance value Rav has not been calculated even once, an appropriate motor resistance value obtained from a measured result or design data, or the like, is held in the estimate calculation unit 56 as the initial value of the average resistance value Rav (the same applies to the average resistance value Rav held in the retained steering determining unit 51). The steered period is a second state period.

With the angular velocity estimating process of the second embodiment, in a retained period, the calculated resistance value Rc obtained from the detected voltage value Vm and the detected current value Im at each control interval is used to calculate an angular velocity estimate ωe. In addition, in a steered period, the average resistance value Rav in the last retained period is used to calculate an angular velocity estimate ωe. In this way, the calculated resistance value Rc as the motor resistance value R used to calculate an angular velocity estimate ωe and the average resistance value Rav are updated. Thus, even when the motor 1 has an individual difference or even when a contact state between a brush and commutator of the motor 1, a temperature, or the like, varies, an angular velocity estimate ωe may be accurately calculated. In addition, the average resistance value Rav in the last retained period is used to calculate a velocity estimate ωe in a steered period. Thus, even when each calculated resistance value Rc obtained in a retained period includes noise, a calculated angular velocity estimate ωe does not significantly vary at the time of shifting between a retained period and a steered period, and a stable angular velocity estimate ωe may be obtained.

Figure 8:
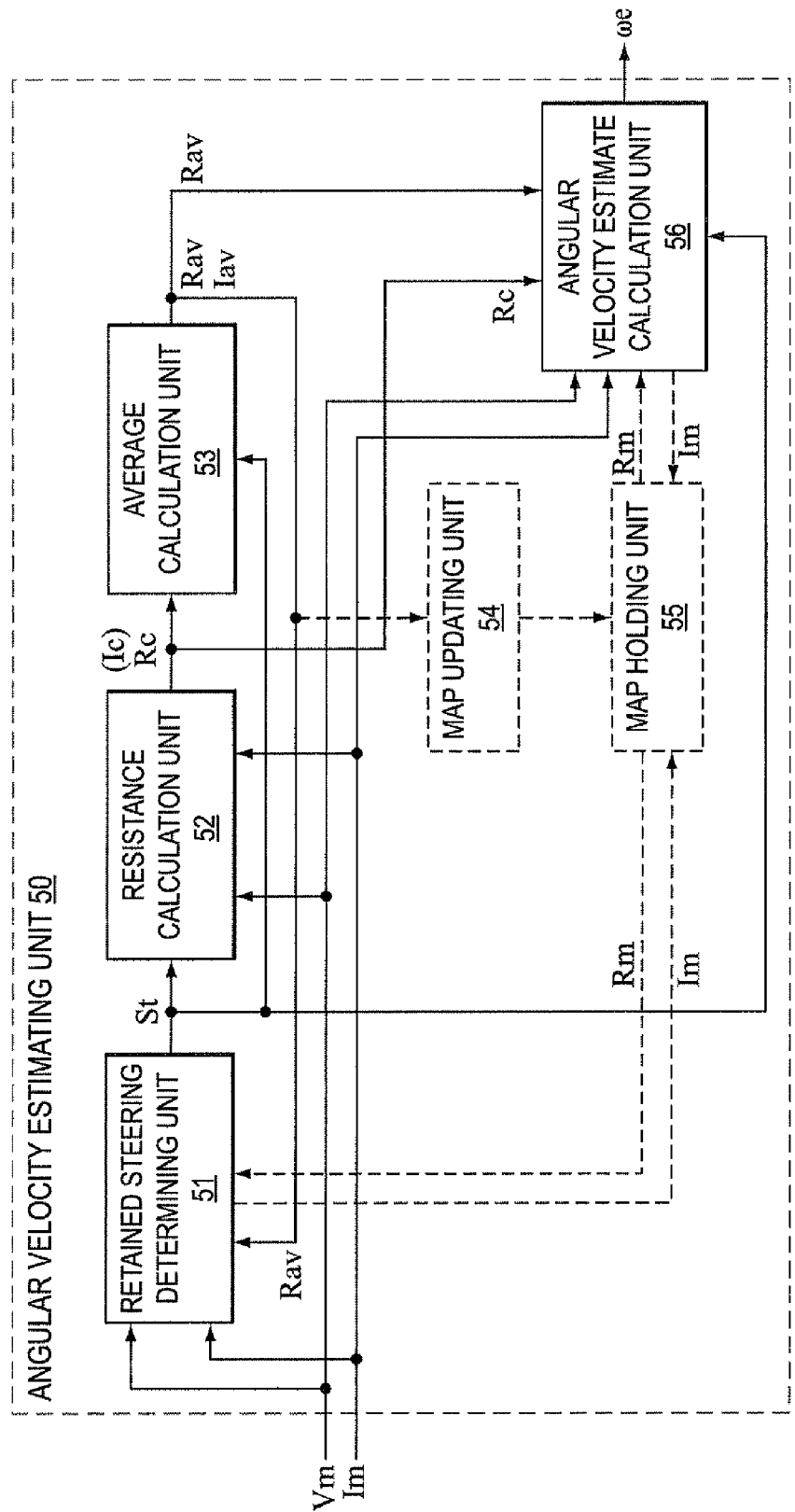
FIG. 8 is a block diagram that shows the configuration of an angular velocity estimating unit corresponding to the angular velocity estimating process in the second embodiment.

Note that, in the angular velocity estimating process of the second embodiment, the resistance map is not used, so the map updating unit 54 and the map holding unit 55 are not necessary in the angular velocity estimating unit 50; however, it is also applicable that, as shown by the dotted line in FIG. 8, the map updating unit 54 and the map holding unit 55 are provided, the resistance map is used to obtain a motor resistance value Rm in a steered period and then the motor resistance value Rm is used to calculate an angular velocity estimate ωe. In this case, each time it shifts from a retained period to a steered period, the resistance map in the map holding unit 55 is desirably updated by the map updating unit 54 on the basis of the average resistance value Rav in the retained period and its corresponding average current value Iav. In addition, when the map holding unit 55 is provided, the retained steering determining unit 51 desirably uses the motor resistance value Rm obtained from the resistance map to calculate a determination angular velocity ωd.

Third Embodiment

Figure 9:
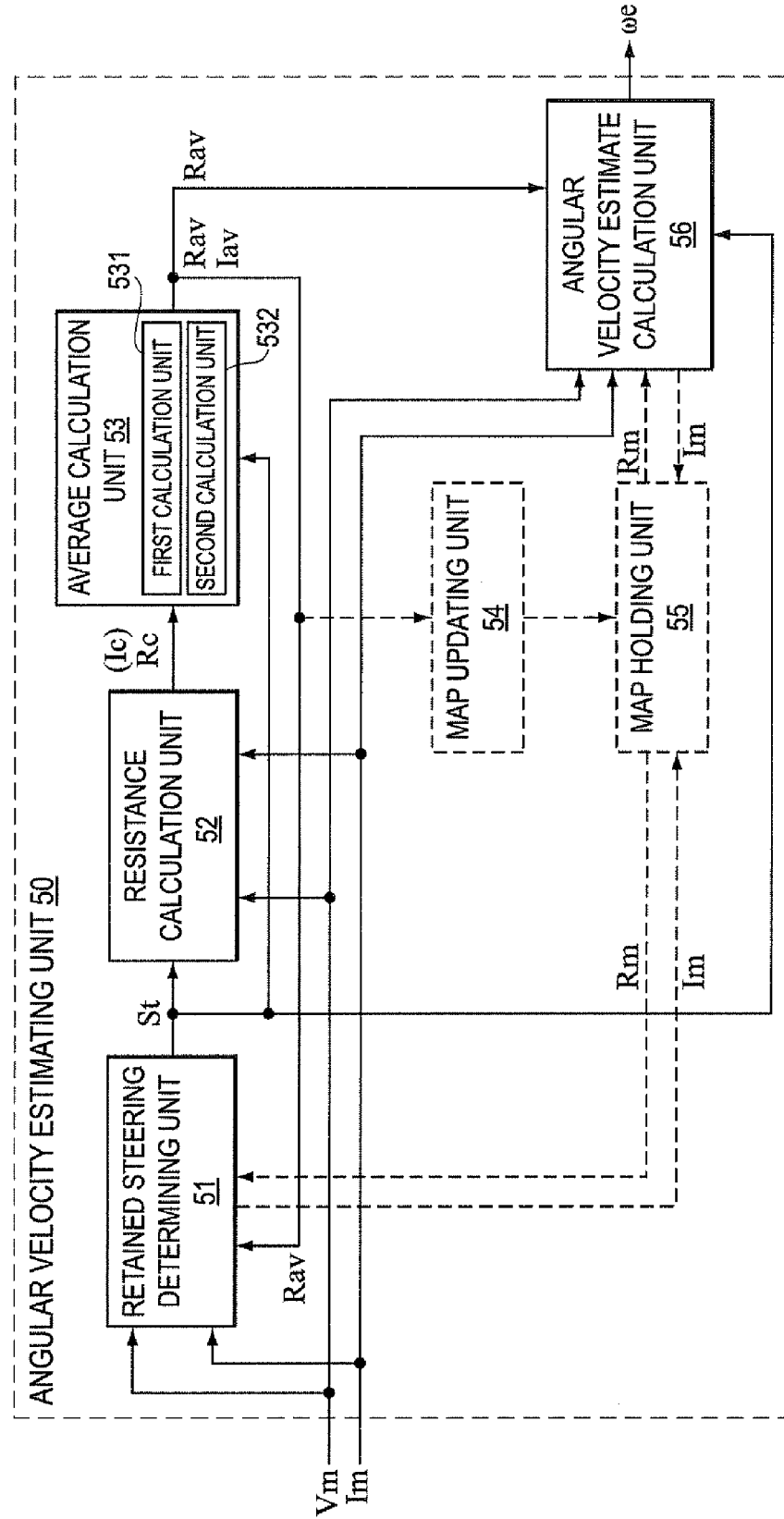
FIG. 9 is a block diagram that shows the configuration of an angular velocity estimating unit corresponding to the angular velocity estimating process in the third embodiment.

FIG. 9 is a block diagram that shows the functional configuration of an angular velocity estimating unit 50 corresponding to an angular velocity estimating process in the third embodiment. The configuration of FIG. 9 is limited from the configuration of the angular velocity estimating unit 50 shown in FIG. 3 so as to correspond to only the angular velocity estimating process. However, when a second angular velocity estimating process is employed in the third embodiment, the average calculation unit 53 includes a first calculation unit 531 and a second calculation unit 532. As the first calculation unit 531 once calculates an average resistance value in a retained period, the second calculation unit 532 calculates an average resistance value in a retained period thereafter. Hereinafter, the angular velocity estimating process of the third embodiment will be described with reference to FIG. 9 together with FIG. 7.

In the angular velocity estimating process of the third embodiment as well as the angular velocity estimating process of the second embodiment, the resistance map is not used. The retained steering determining unit 51 holds the average resistance value Rav in the last retained period, and determines whether it is in the retained state on the basis of the determination angular velocity ωd calculated using the average resistance value Rav by the mathematical expression (2). Within a retained period that is a period during which it is determined by the retained steering determining unit 51 that it is in the retained state (period during which the rotation state signal St indicates the retained state), for example, in a first retained period after start-up of the motor control device, the resistance calculation unit 52 obtains a calculated resistance value Rc using the detected voltage value Vm and the detected current value Im by the mathematical expression (3) at each control interval. Then, the first calculation unit 531 of the average calculation unit 53 accumulates the calculated resistance value Rc obtained at each control interval, and calculates an average resistance value Rav from the accumulated value. In this first retained period, the estimate calculation unit 56 calculates an angular velocity estimate ωe using the calculated resistance value Rc, the detected voltage value Vm and the detected current value Im by the mathematical expression (2).

Also in each retained period that begins after the average resistance value Rab is calculated by the first calculation unit 531, that is, the second or following retained period, the resistance calculation unit 52 obtains a calculated resistance value Rc using the detected voltage value Vm and the detected current value Im by the mathematical expression (3) at each control interval. In addition, in this second or following retained period, the second calculation unit 532 of the average calculation unit 53 sets the average resistance value Rav in the last retained period for a last average value Ravb. Each time the calculated resistance value Rc is obtained, the second calculation unit 532 calculates an average value (Rc+Ravb)/2 of the obtained calculated resistance value Rc and the last average value Ravb as a new average resistance value Rav, and updates the last average value Ravb with the new average resistance value Rav. In this way, in the second or following retained period, a new average resistance value Rav is calculated at each control interval, and the estimate calculation unit 56 calculates an angular velocity estimate ωe using the average resistance value Rav, the detected voltage value Vm and the detected current value Im by the mathematical expression (2).

In a steered period that is a period during it is determined by the retained steering determining unit 51 that it is in the steered state (period during which the rotation state signal St indicates the steered state), the estimate calculation unit 56 holds the average resistance value Rav that is calculated for the last time in the last retained period. The estimate calculation unit 56 calculates an angular velocity estimate ωe using the average resistance value Rav, the detected voltage value Vm and the detected current value Im by the mathematical expression (2) at each control interval.

With the angular velocity estimating process of the third embodiment, in (the second or following) retained period, the average resistance value Rav calculated at each control interval is used to calculate an angular velocity estimate ωe. In addition, in a steered period, the average resistance value Rav in the last retained period is used to calculate an angular velocity estimate ωe. By so doing, even when the motor 1 has an individual difference or even when a contact state between a brush and commutator of the motor 1, a temperature, or the like, varies, an angular velocity estimate ωe may be accurately calculated. In addition, as a retained period begins, the average value (Rc+Ravb)/2 of a calculated resistance value Rc obtained for the first time in that retained period and the average resistance value Rab calculated for the last time in the last retained period is calculated as an average resistance value Rav, and in the steered period immediately before the retained period, the average resistance value Rav calculated for the last time in the last retained period is held. Therefore, even when a calculated resistance value Rc obtained in a retained period includes noise, the average resistance value Rav used to calculate an angular velocity estimate ωe does not steeply vary at the time of shifting from a steered period to a retained period. In addition, in the (second or following) retained period, the average value (Rc+Ravb)/2 of the calculated resistance value Rc obtained at each control interval and the last average value Ravb is calculated as an average resistance value Rav, and the last average value Ravb is updated with the average resistance value Rav. Therefore, in a retained period as well, even when each calculated resistance value Rc includes noise, a stable average resistance value Rav is used to calculate an angular velocity estimate ωe.

Thus, a variation in angular velocity estimate ωe is suppressed at the time of shifting from a retained period to a steered period or in a retained period, and a stable angular velocity estimate ωe may be obtained. As a result, when the motor control device that employs the angular velocity estimating process of the third embodiment is used in the electric power steering, a steering feel improves because of motor control based on a stable angular velocity estimate ωe.

Note that, in the angular velocity estimating process of the third embodiment, the resistance map is not used, so the map updating unit 54 and the map holding unit 55 are not necessary in the angular velocity estimating unit 50; however, it is also applicable that, as shown by the dotted line in FIG. 9, the map updating unit 54 and the map holding unit 55 are provided, the resistance map is used to obtain a motor resistance value Rm in a steered period and then the motor resistance value Rm is used to calculate an angular velocity estimate ωe. In this case, each time it shifts from a retained period to a steered period, the resistance map in the map holding unit 55 is desirably updated by the map updating unit 54 on the basis of the average resistance value Rav obtained for the last time in the retained period and its corresponding average current value Iav. In addition, when the map holding unit 55 is provided, the retained steering determining unit 51 desirably uses the motor resistance value Rm obtained from the resistance map to calculate a determination angular velocity ωd.

Fourth Embodiment

Figure 10:
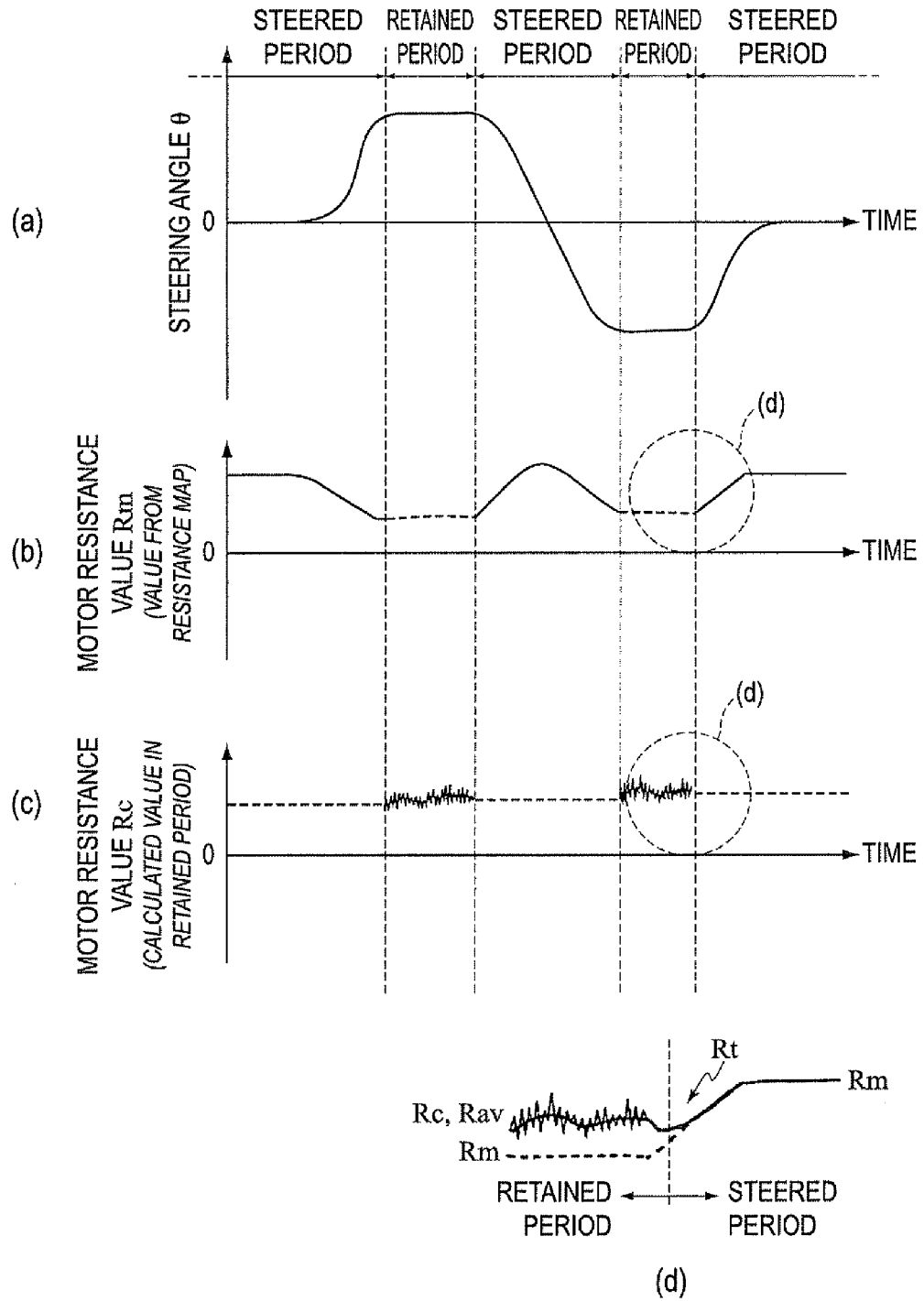
FIG. 10 is a waveform chart for illustrating an angular velocity estimating process in a fourth embodiment.
Figure 11:
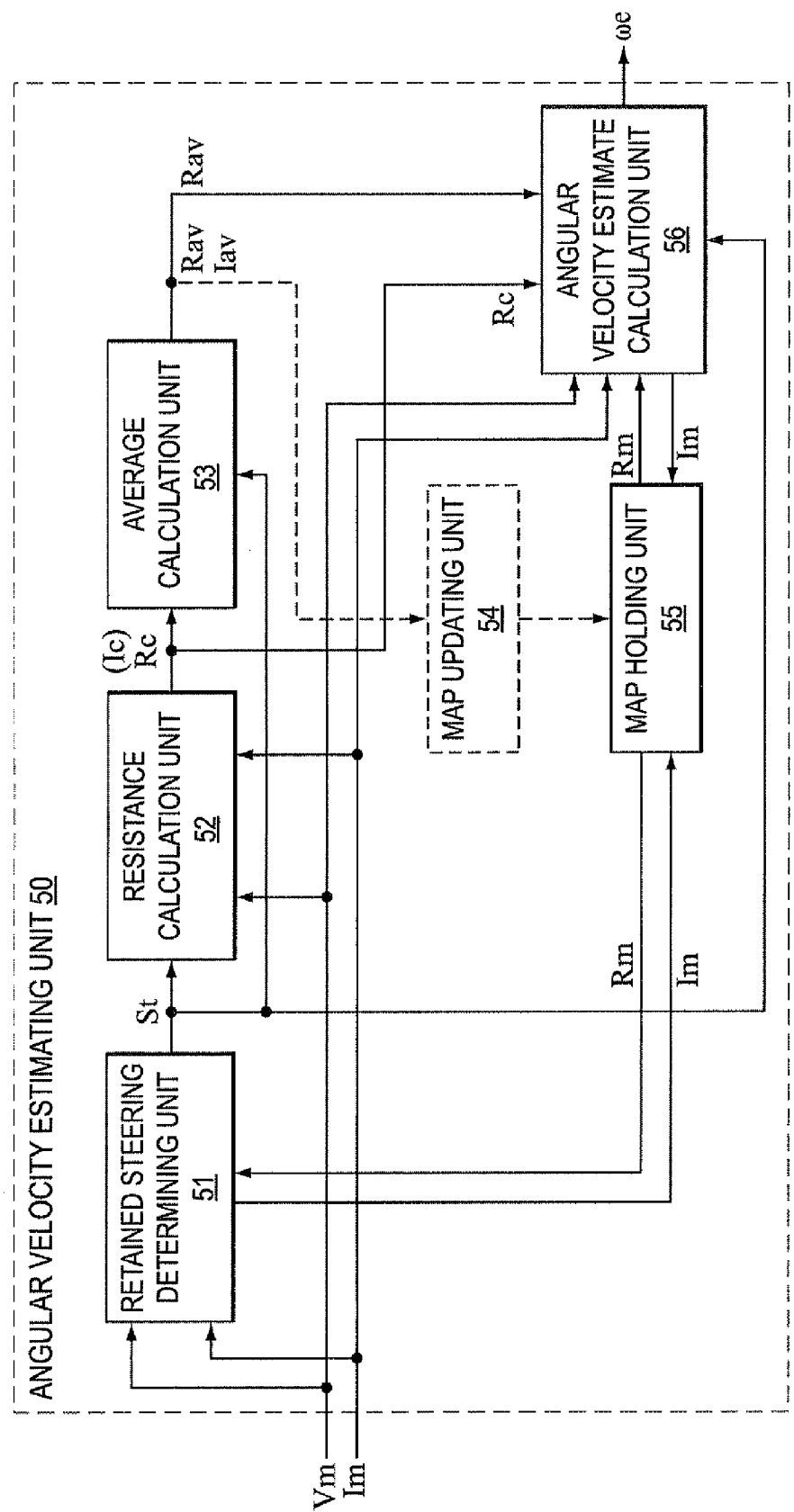
FIG. 11 is a block diagram that shows the configuration of an angular velocity estimating unit corresponding to the angular velocity estimating process in the fourth embodiment.

FIG. 10 is a waveform chart for illustrating an angular velocity estimating process in a fourth embodiment. FIG. 10(*a*) shows a temporal variation in steering angle θ in the electric power steering that uses the motor control device according to the fourth embodiment as the ECU 5. FIG. 10(*b*) shows a variation in motor resistance value Rm used to calculate an angular velocity estimate ωe in a steered period when the steering angle θ varies as shown in FIG. 10(*a*). FIG. 10(*c*) shows a variation in motor resistance value Rc used to calculate an angular velocity estimate ωe in a retained period when the steering angle θ varies as shown in FIG. 10(*a*). In addition, FIG. 11 is a block diagram that shows the configuration of an angular velocity estimating unit 50 corresponding to the angular velocity estimating process in the fourth embodiment. The configuration of FIG. 11 is limited from the configuration of the angular velocity estimating unit 50 shown in FIG. 3 so as to correspond to only the angular velocity estimating process. Hereinafter, the angular velocity estimating process in the fourth embodiment will be described with reference to FIG. 10 and FIG. 11.

In the angular velocity estimating process of the fourth embodiment, in a steered period that is a period during which it is determined by the retained steering determining unit 51 that it is in the steered state, the estimate calculation unit 56 consults the resistance map in the map holding unit 55 to obtain a motor resistance value Rm corresponding to the detected current value Im. The estimate calculation unit 56 calculates an angular velocity estimate ωe using the motor resistance value Rm, the detected voltage value Vm and the detected current value Im by the mathematical expression (2). However, when an angular velocity estimate ωe is calculated in a predetermined period immediately after shifting from a retained period to a steered period, as will be described later, a resistance value Rt that gradually varies from the average resistance value Rav in the retained period to the motor resistance value Rm from the resistance map is used (see FIG. 10(*d*)).

In a retained period that is a period during which it is determined by the retained steering determining unit 51 that it is in the retained state, the estimate calculation unit 56, as well as the first angular velocity estimating process, calculates an angular velocity estimate ωe using the calculated resistance value Rc obtained by the resistance calculation unit 52 at each control interval, the detected voltage value Vm and the detected current value Im by the mathematical expression (2). In addition, in a retained period, the average calculation unit 53, as well as the first angular velocity estimating process, uses the resistance calculation unit 52 to accumulate a calculated resistance value Rc obtained at each control interval, and calculates an average resistance value Rav from the accumulated value.

After shifting from the retained period to the steered period, the estimate calculation unit 56 obtains a resistance value (hereinafter, referred to as "transitional resistance value") Rt that gradually varies from the average resistance value Rav at the end point of the retained period to the motor resistance value Rm obtained from the resistance map as shown in FIG. 10(*d*) during the predetermined period from the shifting point. Then, the estimate calculation unit 56 uses the transitional resistance value Rt to calculate an angular velocity estimate ωe. Then, within the steered period, after the time point at which the transitional resistance value Rt becomes equal to the motor resistance value Rm from the resistance map, that is, after a lapse of the predetermined period, the estimate calculation unit 56 uses the motor resistance value Rm from the resistance map to calculate an angular velocity estimate ωe.

With the angular velocity estimating process of the fourth embodiment, in a retained period, as well as the angular velocity estimating process of the second embodiment, the calculated resistance value Rc obtained from the detected voltage value Vm and the detected current value Im at each control interval is used to calculate an angular velocity estimate ωe. Thus, even when the motor 1 has an individual difference or even when a contact state between a brush and commutator of the motor 1, a temperature, or the like, varies, an angular velocity estimate ωe may be accurately obtained. On the other hand, in a steered period, basically, a motor resistance value Rm from the resistance map is used to calculate an angular velocity estimate ωe; however, in the predetermined period immediately after shifting from a retained period to a steered period, the above described transitional resistance value Rt (FIG. 10(*d*)) is used to calculate an angular velocity estimate ωe. Therefore, a calculated angular velocity estimate ωe does not significantly vary at the time of shifting between a retained period and a steered period, and a stable angular velocity estimate ωe may be obtained.

Note that, in the angular velocity estimating process of the fourth embodiment, the resistance map is not updated on the basis of a calculated resistance value Rc or average resistance value Rav obtained in a retained period, so the map updating unit 54 is not necessary in the angular velocity estimating unit 50; however, it is also applicable that, as shown by the dotted line in FIG. 11, the map updating unit 54 is provided and the resistance map in the map holding unit 55 is updated on the basis of the average resistance value Rav at the end point of a retained period and its corresponding average current value Iav.

<Advantageous Effects>

According to the first to fourth embodiments, even when the resistance map is not used or even when the resistance map is not updated, a calculated resistance value Rc and average resistance value Rav obtained in each retained period are used. Thus, even when the motor 1 has an individual difference or even when a contact state between a brush and commutator of the motor 1, a temperature, or the like, varies, an angular velocity estimate ωe may be accurately calculated. In addition, when the resistance map is used, the resistance map is updated on the basis of an average resistance value Rav and average current value Iav obtained in each retained period, and the like. Thus, even when the motor 1 has an individual difference or even when a contact state between a brush and commutator of the motor 1, a temperature, or the like, varies, a motor resistance value Rm that has a small deviation from an actual motor resistance value may be obtained, and the motor resistance value Rm is used to make it possible to accurately calculate an angular velocity estimate ωe. As the angular velocity estimate ωe is accurately calculated in this way, the control accuracy of the motor control device improves, and a good steering feel may be obtained in an electric power steering that uses the motor control device.

Fifth Embodiment

Next, a motor control device according to a fifth embodiment will be described. The motor control device is also used in the electric power steering shown in FIG. 1. The motor control device is formed using the ECU 5, and drives the brushed motor 1. The configuration of the ECU 5 is similar to that of the first embodiment except that the rotation sensor 7 for determining whether the rotor of the motor 1 is rotating is provided, so like reference numerals denote the same components, and the detailed description is omitted (see FIG. 2).

In the fifth embodiment as well, the control unit 10 that includes the angular velocity estimating unit 50 is implemented by software in such a manner that a microcomputer executes programs stored in a memory (not shown) embedded in the ECU 5, and the functional configuration of the control unit 10 is basically the same as that of the first embodiment, so like reference numerals denote the same or corresponding components, and the detailed description is omitted. The internal configuration of the angular velocity estimating unit 50 in the fifth embodiment slightly differs from that of the angular velocity estimating unit 50 (FIG. 3) of the first embodiment; however, both include the same or corresponding component elements, so, for the internal configuration of the angular velocity estimating unit 50 as well, like reference numerals denote the same or corresponding components. Hereinafter, an angular velocity estimating process for calculating an angular velocity estimate ωe in the angular velocity estimating unit 50 in the fifth embodiment will be described.

Figure 12:
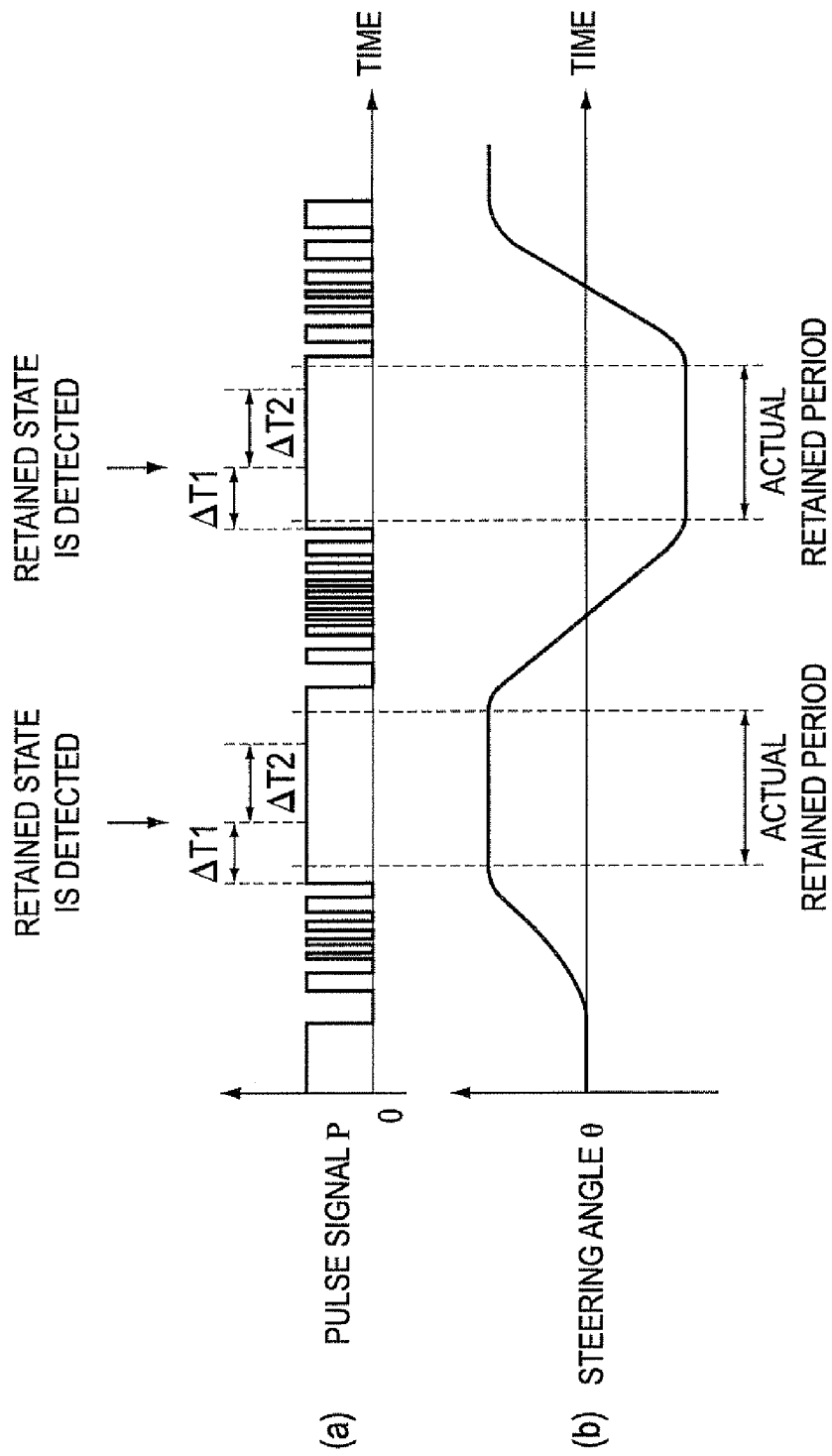
FIG. 12 is a waveform chart for illustrating an angular velocity estimating process in a motor control device according to a fifth embodiment.

FIG. 12 is a waveform chart for illustrating the angular velocity estimating process in the fifth embodiment. FIG.

Figure 13:
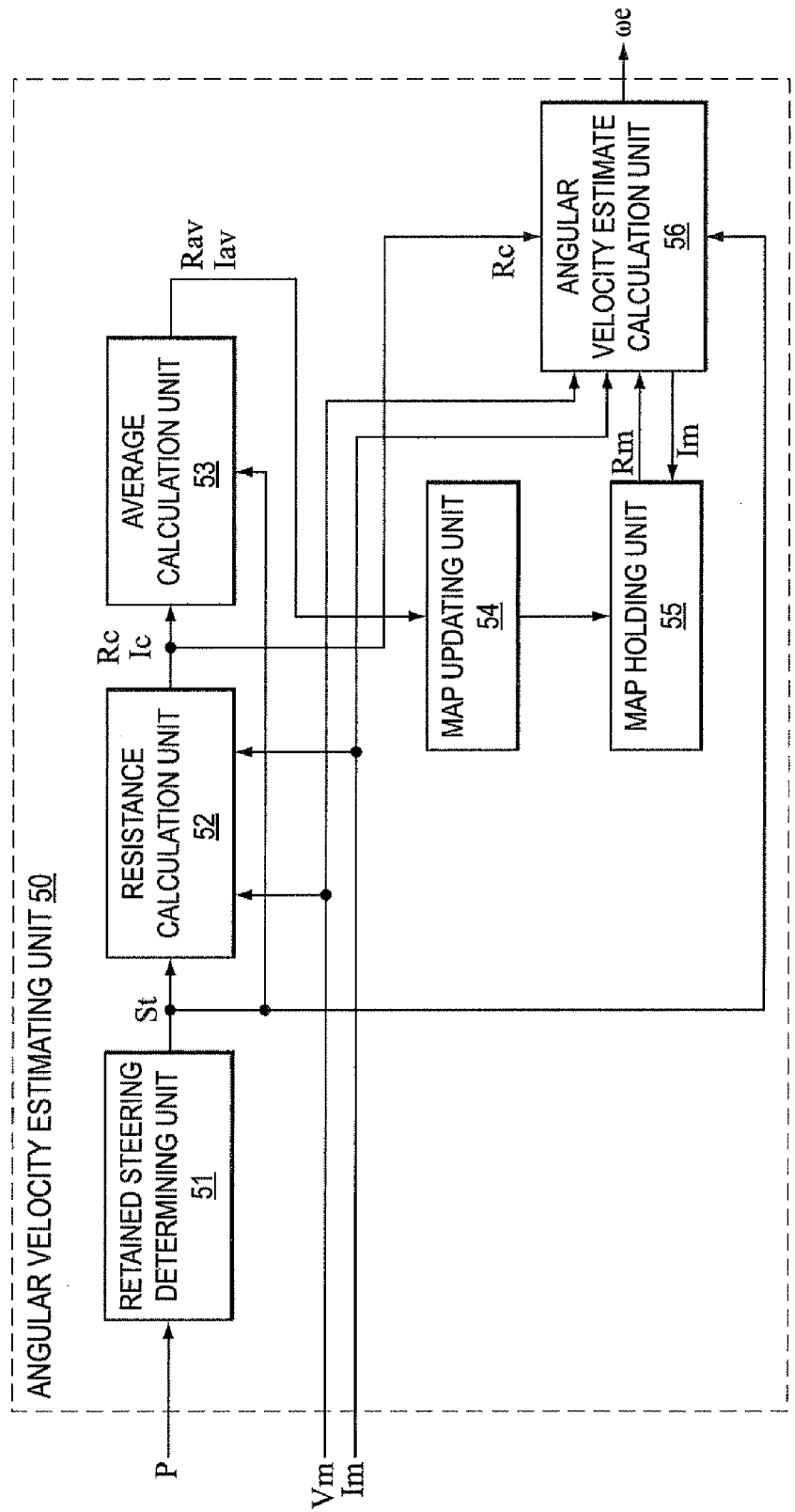
FIG. 13 is a block diagram that shows the configuration of an angular velocity estimating unit corresponding to the angular velocity estimating process in the fifth embodiment.

12(a) shows the waveform of a pulse signal P output from the rotation sensor 7 when the steering angle θ varies as shown in FIG. 12(b) in the electric power steering that uses the motor control device according to the fifth embodiment as the ECU 5. In addition, FIG. 13 is a block diagram that shows the functional configuration of the angular velocity estimating unit 50 corresponding to the angular velocity estimating process in the fifth embodiment. The configuration of FIG. 13 is modified from the configuration of the angular velocity estimating unit 50 shown in FIG. 3 so as to correspond to the angular velocity estimating process in the fifth embodiment. Hereinafter, the angular velocity estimating process in the fifth embodiment will be described with reference to FIG. 12 and FIG. 13.

As shown in FIG. 13, the retained steering determining unit 51 in the fifth embodiment differs from those of the first to fourth embodiments in that, without using a detected voltage value Vm, a detected current value Im or a motor resistance value Rm, it is determined whether the rotor of the motor 1 is rotating, that is, in the retained state, on the basis of the pulse signal P from the rotation sensor 7. Specifically, as shown in FIG. 12(a), the retained steering determining unit 51 determines that it is in the retained state when the rotation sensor 7 does not output a pulse (no pulse appears in the pulse signal P) during a predetermined period of time ΔT1. The retained steering determining unit 51 determines that it is in the steered state when the rotation sensor 7 outputs a pulse (a pulse appears in the pulse signal P) during the period of time ΔT1. The period of time ΔT1 is, for example, ten times as long as the control interval. By setting the period of time ΔT1 appropriately, the retained steering determining unit 51 determines that the rotation speed of the motor 1 is lower than or equal to the predetermined value near 0 and the electric power steering is in the retained state when no pulse is output from the rotation sensor 7 during the period of time ΔT1. The determination result in the retained steering determining unit 51 is input to the resistance calculation unit 52, the average calculation unit 53 and the estimate calculation unit 56 as the rotation state signal St. Note that the retained state is detected when the rotation sensor 7 does not output a pulse during the period of time ΔT1; however, as a pulse is output from the rotation sensor 7 after the detection, the rotation state signal St changes to indicate the steered state at that time point.

While the rotation state signal St indicates the retained state, the resistance calculation unit 52 calculates a motor resistance value (this value is referred to as "calculated resistance value Rc" as well as the first embodiment) using the detected voltage value Vm and the detected current value Im at each control interval. That is, as in the case of the first embodiment, it is assumed that the angular velocity ω is 0, and V=Vm and I=Im are substituted into the mathematical expression (3) to thereby obtain a calculated resistance value Rc. The calculated resistance value Rc obtained at each control interval in this way is input to the average calculation unit 53 together with a calculation-time current value Ic that is a detected current value Im used to calculate the calculated resistance value Rc. In addition, the calculated resistance value Rc is also input to the estimate calculation unit 56.

The average calculation unit 53 accumulates the above calculated resistance value Rc and calculation-time current value Ic obtained at each control interval for a predetermined period of time ΔT2 from when the retained state is detected on the basis of the rotation state signal St from the retained steering determining unit 51. The average calculation unit 53 obtains the average of the calculated resistance values Rc and the average of the calculation-time current values Ic in the predetermined period of time ΔT2 from those accumulated values. The thus obtained average value of the calculated resistance values Rc and average value of the calculation-time current values Ic are input to the map updating unit 54 as the average resistance value Rav and the average current value Iav. Note that the above predetermined period of time ΔT2 just needs to be set to the length such that noise included in the calculated resistance values Rc is sufficiently suppressed through averaging in the predetermined period of time ΔT2 and is shorter than a retained period.

As the average resistance value Rav and the average current value Iav are input from the average calculation unit 53 to the map updating unit 54, the resistance map in the map holding unit 55 is updated on the basis of the input average resistance value Rav and the input average current value Iav. A specific method of updating the resistance map may employ a method similar to that already described in connection with the first embodiment (see FIG. 5A to FIG. 5C and FIG. 6).

While the rotation state signal St indicates the retained state, the estimate calculation unit 56 calculates an angular velocity estimate ωe by the mathematical expression (2) using the calculated resistance value Rc from the resistance calculation unit 52 together with the detected voltage value Vm and the detected current value Im. On the other hand, while the rotation state signal St indicates the steered state, the estimate calculation unit 56 consults the resistance map in the map holding unit 55 to obtain a motor resistance value Rm corresponding to the detected current value Im. The estimate calculation unit 56 calculates an angular velocity estimate ωe by the mathematical expression (2) using the motor resistance value Rm together with the detected voltage value Vm and the detected current value Im. As in the case of the first embodiment, the calculated angular velocity estimate ωe is output from the angular velocity estimating unit 50 and is input to the target current setting unit 12, and is then used to determine a target value It of current that should be passed through the motor 1 (see FIG. 2).

With the angular velocity estimating process in the fifth embodiment, in a retained period, the calculated resistance value Rc obtained from the detected voltage value Vm and the detected current value Im at each control interval is used to calculate an angular velocity estimate ωe. In addition, in a steered period, the motor resistance value Rm obtained from the resistance map updated on the basis of the average resistance value Rav in the predetermined period of time ΔT2 within the last retained period is used to calculate an angular velocity estimate ωe. In this way, the motor resistance value used to calculate an angular velocity estimate ωe is updated. Thus, even when the motor 1 has an individual difference or even when a contact state between a brush and commutator of the motor 1, a temperature, or the like, varies, a motor resistance value Rc or Rm that has a small deviation from an actual motor resistance value is used to make it possible to accurately calculate an angular velocity estimate ωe.

Sixth Embodiment

Figure 14:
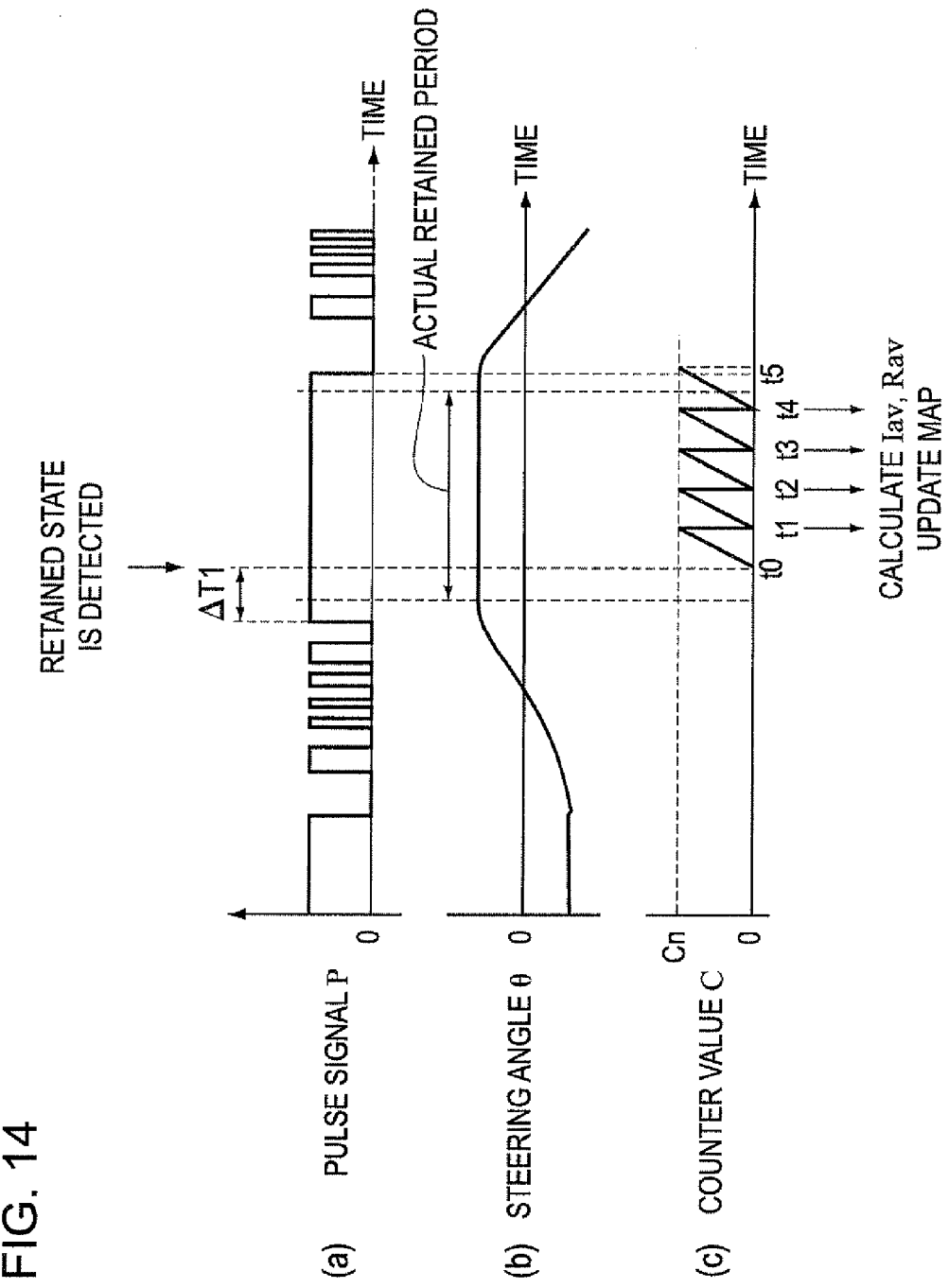
FIG. 14 is a waveform chart for illustrating an angular velocity estimating process in a sixth embodiment.
Figure 15:
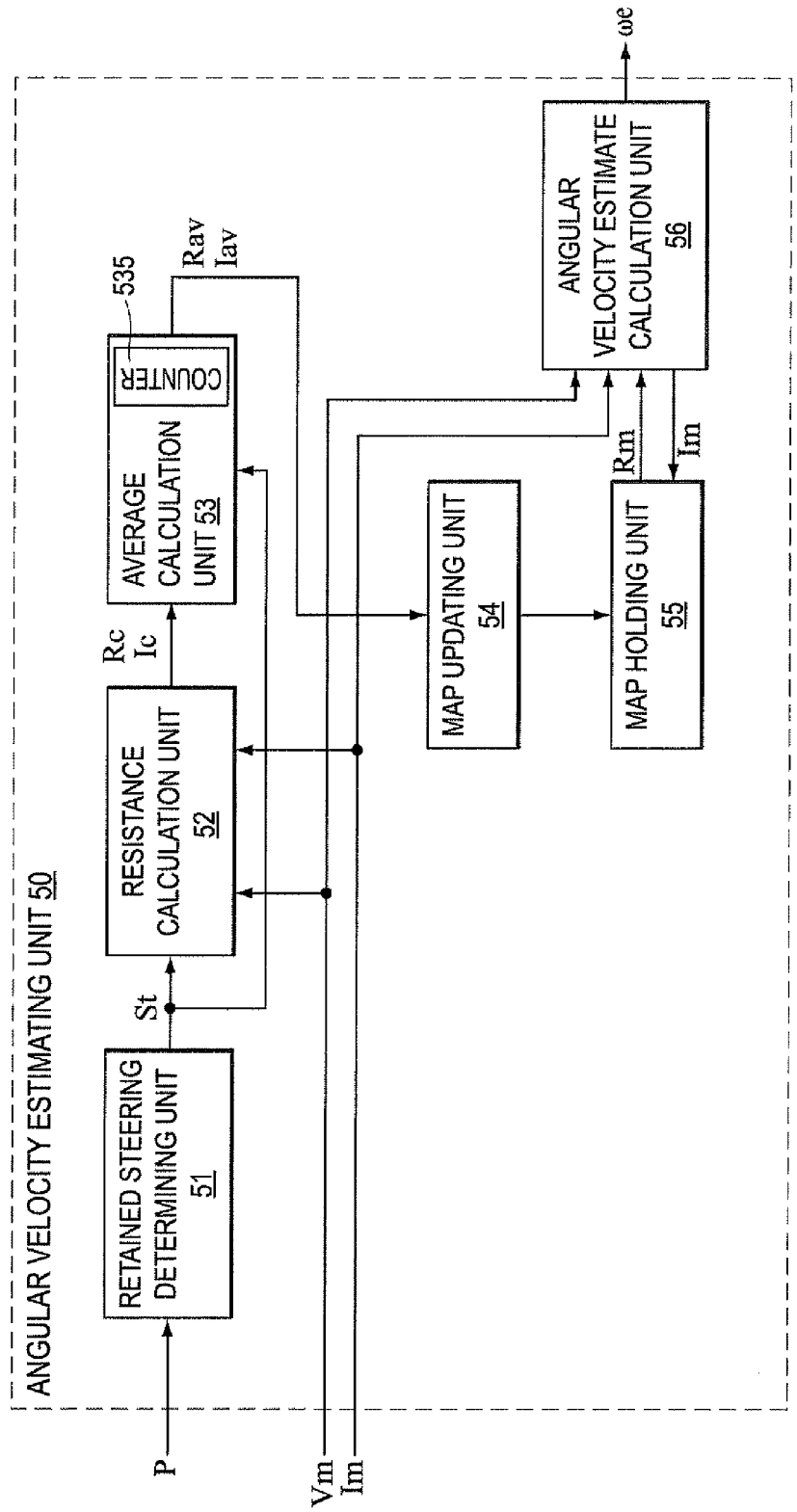
FIG. 15 is a block diagram that shows the configuration of an angular velocity estimating unit corresponding to the second angular velocity estimating process in the sixth embodiment.

FIG. 14 is a waveform chart for illustrating an angular velocity estimating process in a sixth embodiment. FIG. 14(a) shows the waveform of a pulse signal P output from the rotation sensor 7 when the steering angle θ varies as shown in FIG. 14(b) in the electric power steering that uses the motor control device according to the sixth embodiment as the ECU 5. FIG. 14(c) shows a variation in counter value C (described later) in the average calculation unit 53 when the steering angle θ varies as shown in FIG. 14(b). In addition, FIG. 15 is a block diagram that shows the functional configuration of an angular velocity estimating unit 50 corresponding to the angular velocity estimating process in the sixth embodiment. The configuration of FIG. 15 is modified from the configuration of the angular velocity estimating unit 50 shown in FIG. 3 so as to correspond to the angular velocity estimating process in the sixth embodiment. Hereinafter, the angular velocity estimating process in the sixth embodiment will be described with reference to FIG. 14 and FIG. 15.

In the angular velocity estimating process of the sixth embodiment as well, the pulse signal P from the rotation sensor 7 is input to the retained steering determining unit 51. As described above, the retained steering determining unit 51 determines that it is in the retained state when the rotation sensor 7 does not output a pulse during the predetermined period of time ΔT1, and determines that it is in the steered state when the rotation sensor 7 outputs a pulse during the period of time ΔT1 (see FIG. 14(a)). The determination result is input to the resistance calculation unit 52 and the average calculation unit 53 as the rotation state signal St. In addition, in the second angular velocity estimating process as well, the retained state is detected when the rotation sensor 7 does not output a pulse during the period of time ΔT1; however, as a pulse is output from the rotation sensor 7 after the detection, the rotation state signal St changes to indicate the steered state at that time point.

As in the case of the angular velocity estimating process of the fifth embodiment, while the rotation state signal St indicates the retained state, the resistance calculation unit 52 calculates a motor resistance value R using the detected voltage value Vm and the detected current value Im as a calculated resistance value Rc at each control interval. The calculated resistance value Rc obtained at each control interval in this way is input to the average calculation unit 53 together with a calculation-time current value Ic that is a detected current value Im used to calculate the calculated resistance value Rc.

In the angular velocity estimating unit 50 corresponding to the angular velocity estimating process in the sixth embodiment, the average calculation unit 53 includes a counter 535 that increases the count value C by 1 each time one control interval elapses. The counter 535 starts counting from 0 at the time when the retained state is detected on the basis of the rotation state signal St, and is reset each time the count value C reaches a predetermined termination value Cn (for example, 50). When the counter 535 is reset, the counter 535 starts counting from 0 again. In this way, as shown in FIG. 14(c), while the rotation state signal St indicates the retained state, such an operation that counting is started from 0, is reset when the count value C reaches the termination value Cn and counting is started from 0 again is repeated.

As the counter 535 starts counting from 0, the average calculation unit 53 starts accumulating the above calculated resistance value Rc and calculation-time current value Ic obtained by the resistance calculation unit 52 at each control interval. As the count value C of the counter 535 reaches the termination value Cn, the average calculation unit 53 ends the accumulation. The average calculation unit 53 obtains the average value of calculated resistance values Rc and the average value of calculation-time current values Ic from those accumulated values in a period during which the count value C varies from 0 to Cn. As the average value of the calculated resistance values Rc and the average value of the calculation-time current values Ic are obtained in this way, both average values are input to the map updating unit 54 as the average resistance value Rav and the average current value Iav, respectively. Note that, in the following description, when average resistance values Rav and average current values Iav at different calculation time points are distinguished from one another, the number i is suffixed to those reference signs to read as "average resistance value Ravi" and "average current value Iavi" (i=1, 2, 3, ... ).

In the example shown in FIG. 14, at time t0, the retained state is detected and the counter 535 starts counting, and at time t1, the count value C reaches the termination value Cn and the counter 535 is reset and starts counting from 0 again. After that, similarly, the good value C reaches the termination value Cn at each time point of time t2, t3 and t4 and the counter 535 is reset and starts counting from 0 again. After counting is started at time t4, the retained state ends before the count value C reaches the termination value Cn. The end of the retained state is detected through a variation in the pulse signal P, the counter 535 stops operation on the basis of the rotation state signal St. Thus, in the example of FIG. 14, the average resistance value Rav1 and the average current value Iav1 in the period from time t0 to t1 are calculated immediately after time t1, and are input to the map updating unit 54. After that, similarly, the average resistance value Rav2 and the average current value Iav2 in the period from time t1 to t2, the average resistance value Rav3 and the average current value Iav3 in the period from time t2 to t3 and the average resistance value Rav4 and the average current value Iav4 in the period from time t3 to t4 are respectively calculated immediately after time t2, immediately after time t3 and immediately after time t4, and are sequentially input to the map updating unit 54.

Each time the average resistance value Ravi and the average current value Iavi are input from the average calculation unit 53 to the map updating unit 54, the map updating unit 54 updates the resistance map in the map holding unit 55 on the basis of the input average resistance value Ravi and average current value Iavi (in the example of FIG. 14(c), i=1, 2, 3 and 4). A specific method of updating the resistance map may employ a method similar to that already described in connection with the first embodiment (see FIG. 5A to FIG. 5C and FIG. 6).

Irrespective of whether it is in the retained state or the steered state, the estimate calculation unit 56 consults the resistance map in the map holding unit 55 to obtain a motor resistance value Rm corresponding to the detected current value Im. The estimate calculation unit 56 calculates an angular velocity estimate ωe by the mathematical expression (2) using the motor resistance value Rm together with the detected voltage value Vm and the detected current value Im. As in the case of the first embodiment, the calculated angular velocity estimate ωe is output from the angular velocity estimating unit 50 and is input to the target current setting unit 12, and is then used to determine a target value It of current that should be passed through the motor 1.

With the angular velocity estimating process in the sixth embodiment, in a retained period, counting is repeated from when the count value C is 0 to when the count value C is Cn, and the resistance map in the map holding unit 55 is updated on the basis of the average resistance value Rav calculated each time the count value C reaches the termination value Cn. Then, in a retained period, the estimate calculation unit 56 consults the resistance map updated in each predetermined period in this way to obtain a motor resistance value Rm corresponding to the detected current value Im. The estimate calculation unit 56 further calculates an angular velocity estimate ωe by the mathematical expression (2) using the motor resistance value Rm together with the detected voltage value Vm and the detected current value Im. In addition, in a steered period, the estimate calculation unit 56 consults the resistance map updated for the last time in the last retained period to obtain a motor resistance value Rm corresponding to the detected current value Im. The estimate calculation unit 56 further calculates an angular velocity estimate ωe by the mathematical expression (2) using the motor resistance value Rm together with the detected voltage value Vm and the detected current value Im. In this way, the resistance map used to calculate an angular velocity estimate ωe in a retained period and in a steered period is sequentially updated. Thus, even when the motor 1 has an individual difference or even when a contact state between a brush and commutator of the motor 1, a temperature, or the like, varies, a motor resistance value Rm that has a small deviation from an actual motor resistance value may be obtained, and the motor resistance value Rm is used to make it possible to accurately calculate an angular velocity estimate ωe. In addition, not only in a steered period but also in a retained period, ωe is calculated using the resistance map updated on the basis of the average resistance value Rav, so the influence of noise included in calculated resistance values Rc is suppressed.

<Advantageous Effects>

In the fifth and sixth embodiments, it is determined whether it is in the retained state (whether the rotor of the motor 1 is rotating) on the basis of the pulse signal P from the rotation sensor 7, and it is not necessary to detect the rotation direction of the motor 1. Thus, a low-cost Hall sensor, or the like, may be used as the rotation sensor 7. Therefore, in comparison with an existing determination method based on an angular velocity estimate (determination angular velocity) calculated from the detected voltage value Vm, the detected current value Im, and the like, it is possible to accurately determine whether it is in the retained state while suppressing an increase in cost. In addition, according to the fifth and sixth embodiments, the average value Rav of calculated resistance values Rc is obtained in a retained state that is determined on the basis of the pulse signal P, and the resistance map used to calculate an angular velocity estimate ωe is updated on the basis of the average value Rav. Therefore, even when the motor 1 has an individual difference or even when a contact state between a brush and commutator of the motor 1, a temperature, or the like, varies, a motor resistance value Rm that has a small deviation from an actual motor resistance value is used to make it possible to accurately calculate an angular velocity estimate ωe. By so doing, the control accuracy of the motor control device improves, and a good steering feel may be obtained in an electric power steering that uses the motor control device.

Alternative Embodiments, etc.

In the first to fourth embodiments, without providing the rotation sensor 7, it is determined whether it is in the retained state (whether the rotor of the motor 1 is rotating) on the basis of a determination angular velocity ωd calculated using the detected voltage value Vm, the detected current value Im, and the like (see FIG. 3, and the like). In the fifth and sixth embodiments, the rotation sensor 7 is provided (see FIG. 2), and it is determined whether it is in the retained state on the basis of the pulse signal P as the output signal from the rotation sensor 7 (FIG. 12 to FIG. 15). However, instead of this, in the first to fourth embodiments, it may be determined whether it is in the retained state on the basis of the pulse signal P from the rotation sensor 7. Alternatively, in the fifth and sixth embodiments, it may be determined whether it is in the retained state on the basis of a determination angular velocity ωd calculated using the detected voltage value Vm, the detected current value Im, and the like.

In the first and second embodiments, the angular velocity estimating unit 50 is implemented by software in such a manner that the microcomputer 10 executes a predetermined program; instead, part or the whole of the angular velocity estimating unit 50 may be implemented by hardware.

The motor control devices according to the first to sixth embodiments are devices for driving the brushed motor 1; however, the invention is not limited to this. The invention may be applied to a motor of another type as long as it is possible to calculate an estimate of the rotation speed (angular velocity) of a motor from the resistance value of the motor, the detected value of voltage applied to the motor and the detected value of current that flows through the motor on the basis of a counter electromotive force generated in the armature winding of the electric motor.

Note that the invention may be applied to not only the above described column assist-type electric power steering but also a pinion assist-type or rack assist-type electric power steering. In addition, the invention may also be applied to a motor control device of a system other than the electric power steering.

REFERENCE SIGNS LIST

1 brushed motor (electric motor)
5 ECU (motor control device)
7 rotation sensor
54 map updating unit (characteristic updating means)
55 map holding unit (characteristic holding unit)
56 angular velocity estimate calculation unit (estimate calculation means)
531 first calculation unit (first average value calculation means)
532 second calculation unit (second average value calculation means)

The invention claimed is:

1. A motor control device that calculates an estimate of a rotation speed of an electric motor on the basis of a counter electromotive force generated in an armature winding of the electric motor, and that drives the electric motor using the estimate, comprising:

a current detection unit that detects a current flowing through the electric motor;

a voltage detection unit that detects a voltage applied to the electric motor;

a determining unit that determines whether the rotation speed of the electric motor is lower than or equal to a predetermined value that is substantially zero;

a characteristic holding unit that holds a correlation between a current flowing through the electric motor and a resistance of the electric motor as a current-resistance characteristic;

a resistance calculation unit that, when it is determined by the determining unit that the rotation speed of the electric motor is lower than or equal to the predetermined value, calculates a resistance value of the electric motor on the basis of a detected current value obtained by the current detection means and a detected voltage value detected by the voltage detection means;

an estimate calculation unit that calculates a velocity estimate indicating the rotation speed of the electric motor on the basis of the detected current value obtained by the current detection unit, the detected voltage value obtained by the voltage detection unit and a resistance value that is associated with the detected current value by the current-resistance characteristic or the resistance value calculated by the resistance calculation unit; and a characteristic updating unit that updates the current-resistance characteristic on the basis of the resistance value calculated by the resistance calculation unit and the detected current value used to calculate the resistance value.

2. The motor control device according to claim 1, further comprising an average calculation unit that calculates an average value of resistance values calculated by the resistance calculation unit in a first state period that is a period from when it is determined by the determining unit that the rotation speed of the electric motor is lower than or equal to the predetermined value to when it is determined by the determining unit that the rotation speed of the electric motor is higher than the predetermined value,
wherein the estimate calculation unit calculates the velocity estimate on the basis of the average value of the resistance values calculated by the resistance calculation means in a last first state period.

3. The motor control device according to claim 2, wherein, in a second state period that is a period during which it is determined by the determining unit that the rotation speed of the electric motor is higher than the predetermined value, the estimate calculation unit calculates the velocity estimate on the basis of the average value of the resistance values, calculated by the average calculation unit in the last first state period.

4. The motor control device according to claim 2, wherein, as the first state period ends, the estimate calculation unit gradually changes a resistance value used to calculate the velocity estimate from the average value of the resistance values, calculated by the average calculation means in the first state period, to the resistance value determined by the current-resistance characteristic.

5. The motor control unit according to claim 1, further comprising:
a first average calculation unit that calculates an average value of resistance values calculated by the resistance calculation unit in a first state period that is a period from when it is determined by the determining unit that the rotation speed of the electric motor is lower than or equal to the predetermined value to when it is determined by the determining unit that the rotation speed of the electric motor is higher than the predetermined value; and
a second average calculation unit that, as the average value of the resistance values is calculated by the first average calculation unit and then it is determined by the determining unit that the rotation speed of the electric motor is lower than or equal to the predetermined value and a new first state period begins, sets an average value calculated in a first state period immediately before the new first state period as a last average value, and, each time a resistance value is calculated by the resistance calculation unit in the new first state period, calculates an average value of the calculated resistance value and the last average value to update the last average value with the calculated average value,
wherein the estimate calculation unit, in a first state period after the average value is calculated by the first average calculation unit, calculates the velocity estimate on the basis of the average value calculated by the second average calculation unit, and, in a second state period that is a period during which it is determined by the determining unit that the rotation speed of the electric motor is higher than the predetermined value, calculates the velocity estimate on the basis of the average value calculated for the last time by the first or second average calculation unit in a last first state period.

6. The motor control device according to claim 1, further comprising an average calculation unit that calculates an average value of resistance values calculated by the resistance calculation unit in a predetermined period within a first state period that is a period from when it is determined by the determining unit that the rotation speed of the electric motor is lower than or equal to the predetermined value to when it is determined by the determined unit that the rotation speed of the electric motor is higher than the predetermined value, and that calculates an average value of detected current values obtained by the current detection unit at the time when the resistance values are calculated by the resistance calculation means in the predetermined period,
wherein the characteristic updating unit updates the current-resistance characteristic on the basis of the average value of the resistance values and the average value of the detected current values, which are calculated by the average calculation unit.

7. The motor control device according to claim 6, wherein:
the first state period includes a plurality of the predetermined periods;
the average calculation unit calculates the average value of the resistance values and the average value of the detected current values in each of the predetermined periods in the first state period;
the characteristic updating unit updates the current-resistance characteristic in each of the predetermined period in the first state period on the basis of the average value of the resistance values and the average value of the detected current values; and
the estimate calculation unit calculates the velocity estimate on the basis of the detected current value obtained by the current detection unit, the detected voltage value obtained by the voltage detection unit and a resistance value associated with the detected current value by the current-resistance characteristic.

8. The motor control device according to claim 1, wherein the characteristic updating unit, in a coordinate system formed of a first axis that represents a current flowing through the electric motor and a second axis that represents a resistance of the electric motor, translates a characteristic curve that expresses the current-resistance characteristic so as to pass through a point that indicates a pair of values formed of the resistance value calculated by the resistance calculation unit and the detected current value used to calculate the resistance value or so as to pass through a point that indicates a pair of values formed of an average value of the resistance values and an average value of the detected current values, which are calculated by an average calculation unit, in any one of a direction of the first axis, a direction of the second axis and a direction that connects an origin of the coordinate system to the point that indicates the pair of values.

9. The motor control device according to claim 1, wherein the determining unit includes a sensor that outputs a pulse in response to rotation of the electric motor, and determines whether the rotation speed of the electric motor is higher than the predetermined value on the basis of whether the pulse is output from the sensor within a predetermined period of time.

10. An electric power steering that applies steering assist force to a steering mechanism of a vehicle by an electric motor, comprising:
the motor control device according to claim 1,
wherein the motor control device drives the electric motor that applies steering assist force to the steering mechanism.

* * * * *